(12) United States Patent
Boyd et al.

(10) Patent No.: US 11,941,100 B2
(45) Date of Patent: *Mar. 26, 2024

(54) SELECTIVE ACCESS AND VERIFICATION OF USER INFORMATION

(71) Applicant: The Government of the United States of America, as represented by the Secretary of Homeland Security, Washington, DC (US)

(72) Inventors: Daniel A. Boyd, Arlington, VA (US); Kelli L Biegger, Fort Worth, TX (US); Chang Ellison, Arlington, VA (US); Brandon P. Gutierrez, Johns Creek, GA (US); Jason Lim, Alexandria, VA (US); William Washington, North Potomac, MD (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,458

(22) Filed: May 4, 2023

(65) Prior Publication Data

US 2023/0367858 A1    Nov. 16, 2023

Related U.S. Application Data

(63) Continuation of application No. 17/955,801, filed on Sep. 29, 2022, now Pat. No. 11,675,886, which is a
(Continued)

(51) Int. Cl.
*H04L 9/40* (2022.01)
*G06F 21/32* (2013.01)
(Continued)

(52) U.S. Cl.
CPC ............. *G06F 21/32* (2013.01); *G06V 10/40* (2022.01); *H04L 9/0825* (2013.01);
(Continued)

(58) Field of Classification Search
CPC . G06F 21/32; G06F 2221/2133; G06V 10/40; H04L 9/0825; H04L 9/3213; H04L 9/3247; H04L 63/0823
See application file for complete search history.

(56) References Cited

U.S. PATENT DOCUMENTS 9,147,117 B1    9/2015  Madhu et al.
9,305,155 B1    4/2016  Vo et al.
(Continued)

FOREIGN PATENT DOCUMENTS

WO       2016/130168 A1    8/2016

*Primary Examiner* — Ghodrat Jamshidi
(74) *Attorney, Agent, or Firm* — Lavanya Ratnam; Robert W. Busby; Kelly G. Hyndman

(57) ABSTRACT

An apparatus verifies hosted information associated with a user. The apparatus establishes, by the online host serving as a relying party system (RPS), a secure connection between the RPS and a user mobile-identification-credential device (UMD). The RPS sends a mobile identification credential (MIC) user information request to the UMD, via the secure connection, seeking release of MIC user information (official information). The RPS obtains from authorizing party system (APS) verification of the MIC user information received in response to the MIC user information request. The RPS stores the MIC user information as hosted information pertaining to the user. The RPS designates the hosted information as base truth information representing the user.

29 Claims, 19 Drawing Sheets

Related U.S. Application Data continuation of application No. 17/538,356, filed on Nov. 30, 2021, now Pat. No. 11,461,450, which is a continuation of application No. 17/180,421, filed on Feb. 19, 2021, now Pat. No. 11,277,265.

(60) Provisional application No. 63/053,188, filed on Jul. 17, 2020.

(51) Int. Cl.
    *G06V 10/40*         (2022.01)
    *H04L 9/08*          (2006.01)
    *H04L 9/32*          (2006.01)

(52) U.S. Cl.
    CPC .......... *H04L 9/3213* (2013.01); *H04L 9/3247* (2013.01); *H04L 63/0823* (2013.01); *G06F 2221/2133* (2013.01)

(56) References Cited

U.S. PATENT DOCUMENTS

| | | |
|---|---|---|
| 9,355,155 B1 | 5/2016 | Cassel et al. |
| 9,436,818 B1* | 9/2016 | Tooley, II ............... G06F 21/34 |
| 9,672,336 B1 | 6/2017 | Spence |
| 9,886,686 B2 | 2/2018 | Cassel et al. |
| 9,904,916 B2 | 2/2018 | Engström et al. |
| 10,013,983 B1 | 7/2018 | Johnson et al. |
| 10,200,397 B2 | 2/2019 | Dhar et al. |
| 10,387,882 B2 | 8/2019 | Hagen et al. |
| 10,417,621 B2 | 9/2019 | Cassel et al. |
| 10,432,621 B2 | 10/2019 | Vo et al. |
| 10,503,912 B1 | 12/2019 | Kerr |
| 10,607,199 B2 | 3/2020 | Cassel et al. |
| 10,949,434 B1 | 3/2021 | Tirupattur Saravanan et al. |
| 10,970,375 B2 | 4/2021 | Shila et al. |
| 11,005,839 B1 | 5/2021 | Shahidzadeh et al. |
| 2002/0083008 A1* | 6/2002 | Smith ................... G06Q 20/00 705/64 |
| 2007/0046477 A1 | 3/2007 | Kolo et al. |
| 2007/0079136 A1 | 4/2007 | Vishik et al. |
| 2007/0214357 A1 | 9/2007 | Baldus et al. |
| 2007/0299976 A1* | 12/2007 | Zafar ................... H04L 67/1068 709/227 |
| 2008/0184037 A1 | 7/2008 | Johnson |
| 2013/0013553 A1 | 1/2013 | Stibel et al. |
| 2013/0097047 A1 | 4/2013 | Kim |
| 2014/0047049 A1 | 2/2014 | Poston et al. |
| 2014/0181509 A1 | 6/2014 | Liu |
| 2014/0207537 A1 | 7/2014 | Joyce et al. |
| 2014/0270399 A1 | 9/2014 | Johnston et al. |
| 2015/0074268 A1 | 3/2015 | Alms |
| 2015/0078628 A1* | 3/2015 | Anderson ............... G06F 18/22 382/218 |
| 2015/0095162 A1 | 4/2015 | Jakobson et al. |
| 2016/0055322 A1 | 2/2016 | Thomas |
| 2016/0078581 A1 | 3/2016 | Maher |
| 2016/0371438 A1* | 12/2016 | Annulis ................... G06F 21/32 |
| 2017/0032485 A1 | 2/2017 | Vemury |
| 2018/0012324 A1* | 1/2018 | Kelts .................... G06Q 30/018 |
| 2018/0060648 A1* | 3/2018 | Yoo .................... G06V 40/1382 |
| 2018/0165655 A1 | 6/2018 | Marcelle et al. |
| 2018/0336327 A1 | 11/2018 | Wallace et al. |
| 2018/0337917 A1 | 11/2018 | Wallace et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0097802 A1* | 3/2019 | Rowe ................... H04L 9/3213 |
| 2019/0110165 A1* | 4/2019 | Green ................... H04W 4/029 |
| 2019/0163876 A1 | 5/2019 | Remme et al. |
| 2019/0163887 A1 | 5/2019 | Frederick et al. |
| 2019/0163962 A1* | 5/2019 | Chan ................... H04L 67/306 |
| 2019/0164165 A1 | 5/2019 | Ithabathula |
| 2019/0213820 A1 | 7/2019 | Sebes et al. |
| 2019/0287111 A1 | 9/2019 | Cvetkovich et al. |
| 2020/0034553 A1 | 1/2020 | Kenyon et al. |
| 2020/0036528 A1 | 1/2020 | Ortiz et al. |
| 2020/0084039 A1 | 3/2020 | Chabanne et al. |
| 2020/0168306 A1 | 5/2020 | Chen et al. |
| 2020/0236545 A1 | 7/2020 | Xu et al. |
| 2020/0349522 A1* | 11/2020 | Clines ................... G06F 40/174 |
| 2020/0351089 A1 | 11/2020 | Wentz |
| 2021/0105277 A1* | 4/2021 | Epstein ............... H04L 63/1416 |
| 2021/0118084 A1* | 4/2021 | Dharmar ................. H04L 67/02 |
| 2021/0173916 A1 | 6/2021 | Ortiz et al. |
| 2021/0365932 A1 | 11/2021 | Chalikwar |
| 2022/0021666 A1* | 1/2022 | Dande ................... H04L 63/0853 |

\* cited by examiner

SELECTIVE ACCESS AND VERIFICATION OF USER INFORMATION

CROSS-REFERENCE TO RELATED APPLICATIONS

This application is a continuation of U.S. non-provisional application Ser. No. 17/955,801 filed on Sep. 29, 2022, entitled "Verified Hosted Information In Online Galleries," which is a continuation of U.S. non-provisional application Ser. No. 17/538,356 filed on Nov. 30, 2021, entitled "Verified Hosted Information In Online Galleries," which is a continuation of U.S. non-provisional application Ser. No. 17/180,421 filed on Feb. 19, 2021, entitled "Verified Base Image in Photo Gallery," which claims the benefit of priority from U.S. Provisional Application No. 63/053,188 entitled "Authenticated Base Image in Photo Gallery," filed on Jul. 17, 2020, the disclosures of all of which are incorporated by reference in their entireties.

STATEMENT OF GOVERNMENT INTEREST

The present invention was made by one or more employees of the United States Department of Homeland Security in the performance of official duties. The U.S. Government has certain rights in this invention.

FIELD

The discussion below relates generally to verifying user information hosted by an online host.

BACKGROUND

Online hosts, such as social networking sites, dating sites, professional networking sites, and the like, may offer a user a photo gallery feature by which the online host permits the user to upload a picture or pictures that present their image in connection with their online account, optionally with user biographical information such as the user's age, residence, or gender, that purportedly represent the user. Online hosts, and the users of these online hosts, heretofore, have borne a risk that a user may use a photo gallery for deceptive purposes, such as catfishing, social engineering, romance scams, deception, fraud, or other abusive practices. For example, a miscreant user may attempt to develop a false persona by uploading false images—a picture or pictures that do not represent their actual appearance. Such a miscreant user may also upload false biographical information about themselves—a fake name, fake age information, fake gender information, fake residence information, or the like.

SUMMARY

The detailed description below discloses approaches that may ameliorate the foregoing risks by harnessing mobile identification credential technology in a photo gallery scenario, enabling identity verification on mobile and other platforms.

Embodiments described herein may increase the authenticity of photo galleries hosted by online hosts, enabling a user to prove their identity using a mobile identification credential (a MIC), and prove that the user is genuinely represented by the photo gallery. In an embodiment, the user consents to release, to the online host, biometric information including their valid MIC photograph or biographic information including their name, by using the MIC provisioned on a user mobile-identification-credential device (a UMD). Such a photograph (biometric) or other biographic information is inherently trustworthy by virtue of the MIC environment, whereby MIC user information (also referred to as official information) has already been verified. Embodiments enable the user to designate the hosted copy of the authentic MIC photograph or other information as hidden, to prevent the hosted copy from being published or otherwise publicly viewable as part of the hosted gallery. In another embodiment, the user uploads a candidate photograph to the online host, and verifies the candidate photograph using the MIC. In yet another embodiment, the user verifies an already-hosted, previously uploaded photograph which the user selected as an online candidate photograph. In an embodiment, the user performs a liveness check to verify that the user presenting the MIC is the same user who is represented by the MIC user information (i.e., the official information), and not someone else. In yet another embodiment, the online host designates, or allows the user to designate, verified hosted user information as base truth user information. The online host, in turn, uses the base truth user information, in an embodiment, to verify other hosted user information which becomes additional base truth user information.

Using the MIC in these ways improves the host's overall authenticity by avoiding potential misrepresentations or other inaccuracies regarding information submitted to the online host. Furthermore, the approaches described herein protect users from being falsely impersonated by bad actors. In addition, the MIC provides verified, readily-accessed, official biographic and biometric information, which reduces the need for the host to incur network traffic to independently verify submitted information.

One embodiment of a MIC is a mobile driver license (mDL), also referred to as a digital driver license. The MIC is issued by a MIC provider. The MIC provider may be a state department of motor vehicles (DMV). A MIC may also be generated by a private or commercial entity where the commercial or private entity acts as the origin or authorizing party for the MIC.

Employment of the MIC may occur within a supportive environment (disclosed in the detailed description, below). The environment may include a user device to which the MIC is provisioned—a UMD. Within the environment, a MIC provider, also referred to as an authorizing party (AP), in one embodiment, has an authorizing party system (APS) that may provision the MIC to the UMD. The environment also may include a relying party (RP) that will interact with the UMD by way of a relying party system (RPS). In an embodiment, the online host serves as an RPS in communication with the user's UMD.

In an embodiment, the user interacts with the online host via an app running on the user's UMD, or by using the UMD to visit a web site operated by the online host. In another embodiment, the user interacts with the online host by using a web-capable device such as a laptop, tablet, desktop computer, or other device that interfaces with the UMD to facilitate online communication between the UMD and the online host. For example, the UMD can be a USB storage device storing a MIC for the user, which is interfaced with the user's laptop serving as a web-capable device. Communication between the web-capable device and the UMD is handled via wired or wireless connections. In an embodiment, the web-capable device and the UMD establish a local connection via a connection initiated through a UMD camera by visual identification such as a Quick Response (QR) code, bar code or other machine-readable code scannable by the UMD or initiated via electromagnetic radiation communications such as in near-field, Bluetooth, and radio-frequency identification (RFID) technologies.

In a non-limiting embodiment, the UMD may be a smart phone of a user, the MIC may be an mDL, the AP may be the state DMV, the APS may be a computer system of the DMV, the RP may be the online host, and the RPS may be a computer system of the online host.

When the user interacts with the online host RPS, they may choose to use their UMD provisioned with a MIC to control the release of their official information to the RPS. These choices may be made via a dialog conducted between the RPS and the UMD—a release dialog (also referred to as a privacy dialog or, in some embodiments, a consent dialog). During the dialog, the RPS sends the UMD a request for the official information. With the permission of the user, in an embodiment, the APS releases the MIC user information requested by the RPS; the RPS provides the user information associated with the MIC. The user is prompted to consent to the release of their official information (such as a photograph depicting the user) and, in an embodiment, relevant files or uploads associated with the interaction with the online host, such as a candidate photograph depicting the user and a resume for a professional social network, and the like.

Using the MIC environment in these ways improves the overall experience for users and online hosts by (1) protecting the user by preventing bad actors from impersonating the user through online photographic galleries including photos of the user that misrepresent the user; and (2) protecting the online host by ensuring the host is receiving official, biographic, biometric and other MIC user information (e.g., driver's license photograph, name, address) that reduces the need for the online host to separately check the validity of such user information.

Though interactions in an online host context are discussed throughout this application, the principles of this disclosure apply to other situations and environments.

Although MIC user information is also referred to as official information, the term is not restricted to official government information but also includes verified information from a non-governmental source. For example, a third party can provide official information about an individual.

The detailed description below elaborates on the foregoing, non-limiting embodiments, and on other embodiments not mentioned in this summary. Other features and aspects of the embodiments will become apparent to those of ordinary skill in the art from the following detailed description, which discloses, in conjunction with the accompanying drawings, examples that explain the features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

In an environment that supports its use, a mobile identification credential (MIC) can enable a user to conveniently prove their identity. One embodiment of a MIC is a mobile driver license (mDL) issued by an official agency such as a state department of motor vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself is portable and can be provisioned to devices. Below, the device to which the MIC is provisioned is referred to hereafter as a user mobile-identification-credential device (UMD). The term UMD pertains to any device to which a MIC can be provisioned including, without limitation: smart watches, smart fitness bands, smart objects, smart phones, e-readers, tablet computers, smart televisions and displays, smart cameras, laptop computers, desktop computers, embedded computers, servers, chips, flash drives, and USB drives.

In one embodiment, the issuer of the MIC (the MIC issuer) may provision and issue the valid, authentic MIC to the UMD. The issuer of the MIC also may work with a MIC provider to facilitate the provisioning of the MIC to the UMD. The MIC issuer also may work with a third party to provision the MIC to the UMD. In another embodiment, the user may provision the MIC from one device of the user to another device of the user (for example, from their desktop computer to their smart fitness band).

A MIC may be validated by an authorizing party (AP). In one embodiment, the AP is an official agency such as a state DMV. In another embodiment, the AP is a third party empowered by an official agency to perform such verification operations. The AP employs an authorizing party system (APS). The APS may provision the MIC to the UMD.

The UMD may interact with other devices to temporarily and selectively share some or all the content of the MIC. The device through which the UMD shares the MIC user information is referred to as a relying party system (RPS). The RPS is a system operated by or for a relying party (RP).

Figure 1:
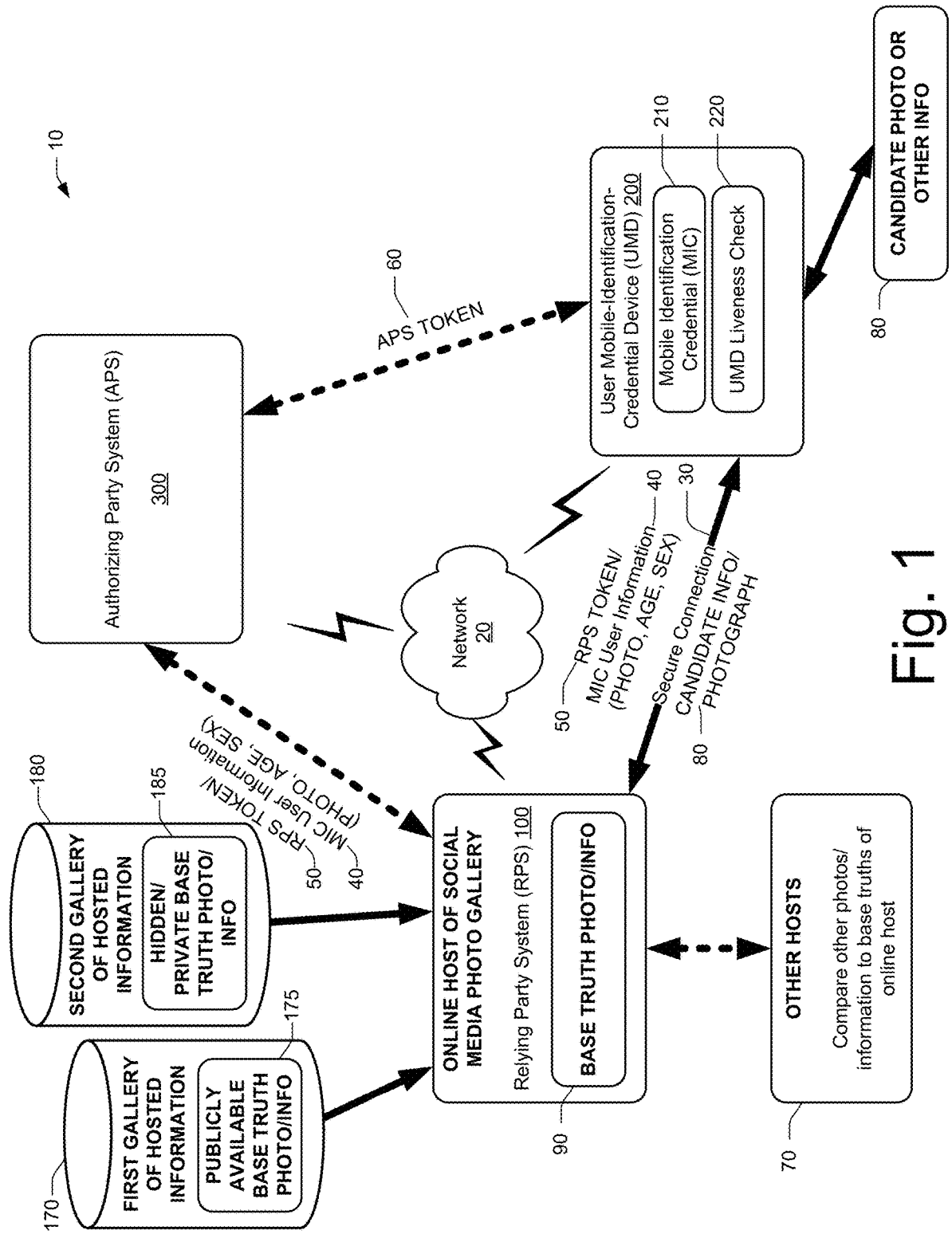
FIG. 1 illustrates a MIC environment including a UMD to provide MIC user information and an online host RPS to request MIC user information according to an embodiment.

FIG. 1 illustrates an embodiment of a MIC environment 10 including a UMD 200 to provide MIC user information 40. In an embodiment, the online host serving as the RPS 100 requests some or all of MIC user information 40 according to an embodiment. After a privacy dialog in which the user of the UMD 200 consents to providing the requested portion of MIC user information 40, the RPS 100 may pass the MIC user information 40 or an RPS token 50 to the APS 300. The RPS 100 may receive from the APS 300 a verification, of the MIC user information 40, or the MIC user information 40 itself. The RPS 100 may then establish base truth photograph 90 and other base truth information, as stored, for example, in first gallery 170 and optionally in second gallery 180.

The MIC environment 10 may thus supply information or privileges associated with the MIC or verify user-supplied information such as uploaded candidate information. Such information may include a photograph associated with the MIC. For example, when the MIC is an mDL, the photograph may be a driver license photograph. An official photograph associated with a MIC may be referred to as part of MIC user information 40.

When a user desires to use a photograph other than that in the MIC user information 40, the user may in an embodiment supply a different photograph referred to as candidate photograph 80. In this embodiment, the official photograph in the MIC user information 40 is biometrically compared with the user-supplied photograph in the candidate photograph 80. If the candidate photograph 80 matches the MIC user information 40 to a set match threshold the candidate photograph 80 may be designated as additional base truth information.

In embodiments, the APS 300, the UMD 200, or the online host serving as the RPS 100 perform comparisons between candidate information, such as candidate photographs, and base truth information, such as the official MIC photograph (whether stored at the UMD 200 or APS 300). For example, the RPS 100 is configured to perform comparisons based on candidate information submitted by a UMD 200 via an app or website of the RPS 100 with which a user interfaces via their UMD 200. In yet other embodiments, such comparisons are performed on candidate information that is captured as part of a liveness check (such as UMD liveness check 220, also referred to as a biometric check), whether performed as described herein by the APS 300, the UMD 200, or the online host serving as the RPS 100. For example, a photo-based liveness check captures a liveness photograph and provides a copy of the liveness photograph to be compared against official records. In other embodiments, the liveness check involves other types of methodologies such as retina scan, fingerprint, facial motion, heat detection, blood flow or pulse detection, and the like, associated with the capture of corresponding liveness information that is usable as candidate information. Additional types of liveness checks are described in further detail below, which can be harnessed to provide candidate information for comparison against official information or hosting at the online host in a gallery as base truth information. An image capture or photo from the liveness check that is matched to an official record may also be used as base truth information.

In another embodiment, the entity performing the candidate information (biometric or biographic) comparison is different than, and provides verification on behalf of, the entity at which the candidate information is eventually stored. For example, the APS 300 (such as a local DMV) compares a candidate photograph from the online host serving as the RPS 100 against an official photograph stored at the APS 300, and verifies the candidate photograph as a match, thereby approving the candidate information (which may include biographic information linked to the official photograph by the APS) for use as a base truth stored in a gallery at the online host serving as the RPS 100. Accordingly, the base truth at the online host serving as the RPS 100 carries the authority of having been verified by an official state entity, i.e., the local DMV.

The processing associated with performing comparisons of candidate information may be implemented in different ways. In one embodiment, an APS 300 such as a DMV may perform a threshold image comparison between the candidate photograph 80 and the verified MIC user information photograph of the user (the official photograph associated with the MIC). In another embodiment, the user's UMD 200 performs the threshold image comparison between the candidate photograph 80 and the MIC user information 40 photograph of the user. In yet another embodiment, the online host serving as the RPS 100 performs the threshold image comparison between the candidate photograph 80 and the MIC user information 40 photograph of the user.

Upon favorable comparison results, the online host serving as the RPS 100 treats the candidate photograph 80 as a base truth photograph 90 of the user. In other words, when the candidate photograph 80 and the official photograph associated with the MIC match closely enough, to within a match threshold, the candidate photograph 80 is determined to be a base truth photograph 90 even if it is not identical to the official photograph, and becomes part of additional base truth information for the user to be used for future comparisons or verifications. Other information can qualify as base truth information, such as a user's date of birth or full name, or other MIC user information 40 or other candidate information uploaded by the user. When the comparison results are not favorable (e.g., when the comparison does not meet a match threshold), embodiments may delete the hosted information that does not represent the user.

The additional base truth photograph of the user, in turn, can in an embodiment be used to verify other photographs of the user independent of the MIC, thereby building a gallery of photographs that can be relied upon by others as images of the user. For example, the online host serving as the RPS 100 uses the base truth photograph 90 to determine whether other images of the hosted photographic gallery of the user match the base truth photograph 90 to within a threshold percentage, e.g., using facial recognition algorithms or other techniques to compare and match photographs.

In another embodiment, other hosts 70 request verification of other photos or information, for comparing against either the base truth photograph 90 or information of the online host serving as the RPS 100, or candidate photo 80 or other information after verification and designation as additional base truth information.

In yet another embodiment, the user verifies, via the MIC 210, other biographic or biometric information from the MIC user information 40 submitted to the online host, such as the user's age. In yet another embodiment, the online host serving as the RPS 100 allows the user to select an existing, already-hosted image (i.e., user-designated hosted information) in a photographic gallery to serve as the candidate photograph 80 to be established as a base truth photograph 90, e.g., by verifying the already-hosted image against the MIC user information 40 photograph. Other embodiments enable the user to selectively release a portion of MIC user information 40 to the online host serving as the RPS 100, and also to selectively indicate whether released MIC user information 40 is approved for public release (i.e., publicly available base truth 175) or is to be hidden from public view (hidden or private base truth 185 that is otherwise usable by the online host serving as the RPS 100, e.g., to verify eligibility or qualification for online host privileges). In an embodiment, the user uploads a first gallery 170, of hosted information or photographs, that has the user's consent to become public, and the user uploads a second gallery 180 of hosted information or photographs that is designated by the user as private. Thus, embodiments enable a user not only to selectively approve what types of information are uploaded to the online host, but also to selectively approve what types of information are made publicly available. In an embodiment, a user elects to publicize their age at the online host, while hiding their official base truth photograph. In another embodiment, a user elects to share biographic data either specifically or within a verified range, for example an age that is twenty-one or over, above eighteen or within a specified range of for example thirty-five to forty-five. The biographic information may also be selectively provided, for example male or female is identified but height or weight is not. The data elements containing characteristics able to be selectively provided are limited to those contained within the MIC.

As already discussed, the MIC environment 10 acts as a system that supports MIC 210 use. To review, the user has a MIC 210 such as a mobile driver's license (mDL) on their UMD 200 as part of MIC environment 10 that supports MIC 210 use. In such an environment, a MIC 210 is issued by an authorizing party, such as a state department of motor vehicles, using the APS 300. The APS 300 provisions the MIC 210 to the UMD 200. The APS 300 is available via network communication to interact with the RPS 100 and UMD 200 as described herein. The UMD 200 interacts with another device to share some or all the content of the MIC 210. The device that is to receive the MIC user information 40 is RPS 100.

Embodiments of the MIC environment 10 are compatible with multiple, different forms of identification (ID) and corresponding authorizing parties. For example, the MIC environment 10 supports non-governmental forms of ID, including those from private companies, such as Apple ID® and the like. Furthermore, embodiments are compatible with forms of employee IDs, used to prove employment status (e.g., by including a verifiable employee ID number).

In this embodiment of MIC environment 10, the online host serving as the RPS 100 interacts with the user's UMD 200 via the secure connection 30, which in an embodiment, is the Internet or other form of remote connection (e.g., via a cellular network). In an embodiment, the user desires to use the UMD 200 to establish an online photographic gallery at the online host serving as the RPS 100. The UMD 200 and RPS 100 establish the secure connection 30, and the RPS 100 requests information from the UMD 200 which the RPS 100 uses to verify at least one base truth photograph 90 or other information. In response to such a request to verify from the RPS 100, the user selects whether to release the requested portion of MIC user information 40 or candidate information and has control sufficient to release the various types of information discretely—in whole or in parts selected by the user.

In an embodiment, when the user releases part or all of the MIC user information 40 from the user's MIC 210, an RPS token 50 passes to the RPS 100 and an APS token 60 passes to the APS 300. The RPS 100 communicates with the APS 300, which compares the APS token 60 received from the UMD 200 to the RPS token 50 received from the RPS 100. Upon verifying a match, the APS 300 provides a copy of the MIC user information 40 to the RPS 100. The user also selectively controls uploads or releases of candidate photograph 80 or other candidate information from the UMD 200 (whether directly from the UMD 200 or via a web-enabled device through which the UMD 200 is communicating) to the RPS 100.

In embodiments, the RPS 100 uses digital signatures or encryption to obtain verification of MIC user information 40, and the MIC user information 40 is received from the UMD 200 instead of the APS 300. Public-key cryptography, or asymmetric cryptography, is a cryptographic system that uses pairs of keys to provide verification. Public keys may be disseminated widely and publicly, and private keys are known only to the owner. Such keys are generated by cryptographic algorithms based on mathematical problems to produce one-way functions. The private key is kept private, and the public key can be openly distributed without compromising security. In another embodiment, the RPS 100 does not contact the APS 300 but uses a stored public key of the APS 300 to determine that the MIC user information 40 is trustworthy as received from the UMD 200.

In another embodiment, the UMD 200 sends an RPS. token 50 to the RPS 100 and sends an APS token 60 to the APS 300: the APS 300 releases the MIC user information 40 only if both the RPS token 50 and the APS token 60 are received and only if within a given timeframe. In another embodiment, the UMD 200 (or the RPS 100) conducts a liveness check 220 to confirm that the user in possession of the UMD 200 matches the MIC 210 provisioned on that UMD 200. In yet another embodiment, the RPS 100 or the APS 300 facilitates the liveness check 220 performed by the UMD 200, e.g., by processing information collected by the UMD 200 as part of the liveness check 220.

In one embodiment, the user initiates communication with the online host serving as the RPS 100 to upload photographs of the user, e.g., via a mobile app provided by the online host serving as the RPS 100 that is installed on the mobile device on which the MIC 210 is provisioned. In this example, the MIC 210 is a mobile driver's license (mDL) issued by the user's Department of Motor Vehicles (DMV). The online host acts as the RPS 100 to request information from the user, and the online host serving as the RPS 100 verifies submitted MIC user information 40 via the DMV serving as the APS 300.

In an embodiment, data transfers are digitally signed, via electronic certificates, to verify the data transfers. In another embodiment, in addition to or instead of the use of digital signatures for verification, data transfers are encrypted via public-key cryptography to ensure integrity of the data transfers. In yet another embodiment, data transfers utilize tokenization to safeguard online data transfers. Other embodiments rely on combinations of multiple such data protection procedures, as well as other data security best practices.

In some embodiments, secure local or remote connections are established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key of to generate Device 2's public key, and Device 2's public key is shared with Device 1. These ephemeral key pairs are used to encrypt and to decrypt messages sent between Device 1 and Device 2. A session begins when the two devices acknowledge each other and open a virtual connection and ends when the two devices have obtained the information they need from each other and send "finished" messages, terminating the connection. Embodiments may make use of such session keys or other practices for establishing secure local or remote connections.

In an embodiment, the online host serving as the RPS 100 uses the MIC user information 40 from the user to verify an existing photograph stored in the online host's social media first gallery 170 or second gallery 180, which then serves as a hosted base truth photograph 90, 175, or 185 of the user in the first gallery 170 or second gallery 180. For example, the online host serving as the RPS 100 verifies that its base truth photograph 90 matches the MIC user information 40 photograph to within an acceptable threshold. The online host serving as the RPS 100 marks the base truth photograph 90 as trustworthy, allowing the base truth photograph 90 to serve as a reference against which other photographs of the user are compared, whether by the online host serving as the RPS 100 comparing other gallery photographs, or by other hosts 70 comparing other photographs. The user similarly selectively allows the online host serving as the RPS 100 to access and verify other MIC user information 40, such as age and sex.

Figure 2:
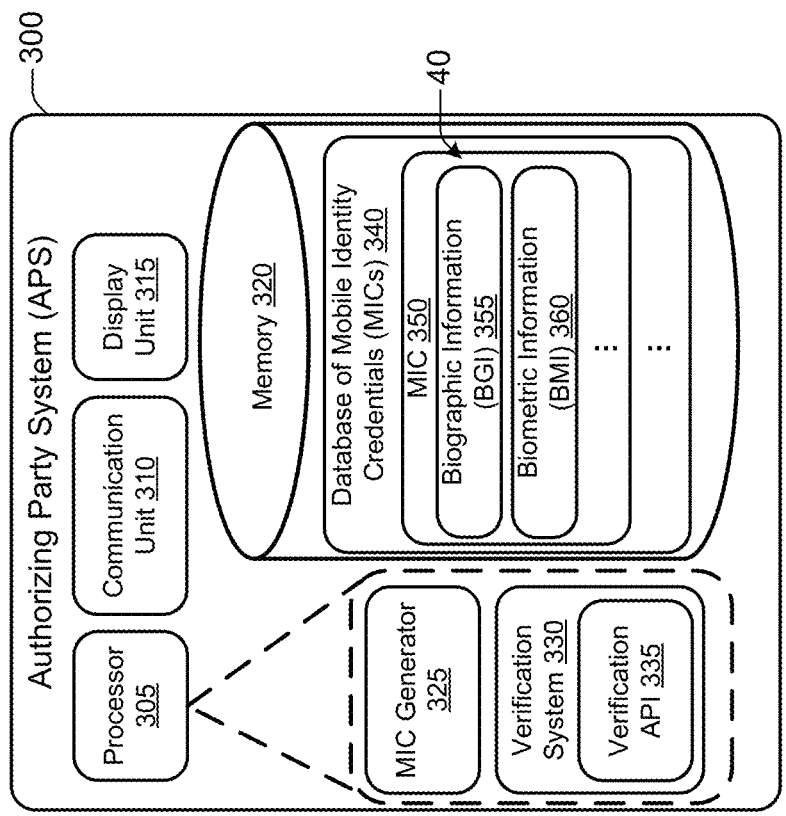
FIG. 2 illustrates an APS according to an embodiment.

FIG. 2 illustrates an APS 300 according to an embodiment. The APS 300 includes a processor 305, communication unit 310, display unit 315, and memory 320. The processor 305 is associated with logic or modules to process information, including a MIC generator 325 and a verification system 330 with a verification Application Programming Interface (API) 335.

The MIC generator 325 enables the APS 300 to generate a MIC 350 for a given user. For example, the MIC generator 325 receives unique information about the user, such as a social security number. The APS 300 can reside in a local DMV office staffed with agents to verify physical documents in person, to traditionally verify that the social security number belongs to that user. The MIC generator 325 creates a framework to build the MIC 350 for the user and populates the MIC 350 with corresponding biographic information (i.e., BGI 355) and biometric information (i.e., BMI 360), e.g., as available locally at the DMV office. In embodiments, the MIC generator 325 populates the MIC 350 with other information corresponding to the user, such as privileges. Generated MICs 350 are stored at the memory 320 of the APS 300 and available for provisioning onto the UMD 200 of the user. In an embodiment, a given APS 300 provisions multiple different MICs 340 onto the UMD 200, e.g., at an APS 300 that provides an mDL and employment IDs.

The verification system 330 of the APS 300 is configured to interact with an RPS 100, such as when handling requests received from an RPS 100 for MIC user information 40. In the illustrated embodiment, the verification system 330 uses a verification API 335 to handle interactions in a standardized computing format. In another embodiment, the verification system 330 is configured to interact with a UMD 200, e.g., to provision a (provisioned) MIC 210 onto the UMD 200 or receive RPS tokens 50 from the UMD 200. In yet another embodiment, the verification system 330 is configured to interact with other systems to verify information. Such other systems include other APSs including government entities, trusted certificate holders, open ID providers, back ends, and the like.

In an embodiment, the verification system 330 is configured to receive an APS token 60 from the UMD 200, and an RPS token 50 from the RPS 100. The verification system 330 then compares the tokens to determine whether the tokens match and were received within an acceptable timeframe. In an embodiment, matching tokens indicates that the RPS 100 is trustworthy regarding UMD consent and MIC user information 40.

The memory 320 is associated with a database of MICS 340. A given MIC 350 includes BGI 355 and BMI 360, which can be selectively requested and provided, e.g., as MIC user information 40, when the MIC 350 is provisioned onto a UMD. The MIC 350 also can include other information, such as privileges pertaining to the user.

The MIC 350 generally is structured to securely and discretely store various fields comprising the BGI 355, BMI 360, or other information. For example, the BGI 355 includes first name, last name, date of birth, sex, address, identifier number, organ donor status, and the like. In an example, the BMI 360 includes a digital photograph, a digital image representing a QR code containing the BGI 355, a digital fingerprint representation, a digital retina representation, and the like.

In embodiments, the MIC 350 includes other information (see FIG. 4), such as privileges. The structure of the MIC 350 enables the other information to be added, such as when provisioning the MIC 350 from the APS 300 to a UMD 200, or after provisioning the MIC 350 to the UMD 200, such as when the user enters information into the MIC 350 via the UMD 200. Information on the MIC 350 is compartmentalized and independently accessible.

Figure 3:
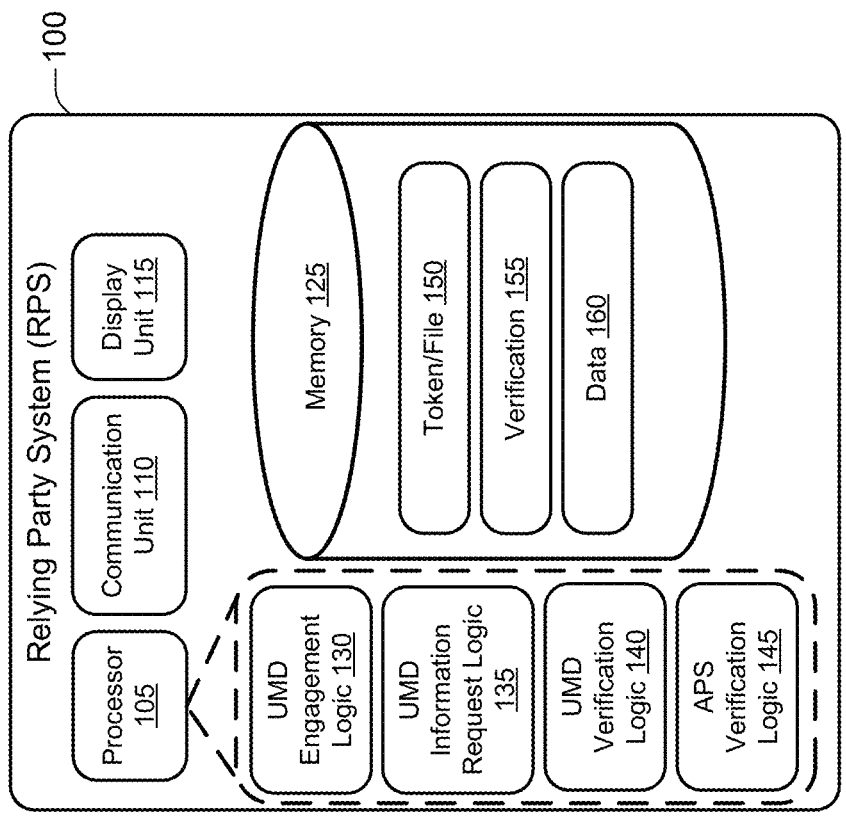
FIG. 3 illustrates an RPS according to an embodiment.

FIG. 3 illustrates RPS 100 according to an embodiment. The RPS 100 includes a processor 105, communication unit 110, display unit 115, and memory 125. The processor 105 is associated with logic or modules to process information, including UMD engagement logic 130, UMD information request logic 135, UMD verification logic 140, and APS verification logic 145. Embodiments of the RPS 100 include hardware to collect information to perform a liveness check of the user, such as a camera, fingerprint reader, retina reader, and the like.

The UMD engagement logic 130 is adapted to enable the RPS 100 to establish a secure connection with an external device (such as the user's UMD 200) via a communication controller as explained above, e.g., based on QR codes or other techniques to establish secure connections. For example, the UMD engagement logic 130 establishes a key exchange protocol usable by the UMD 200, via internet communications. In an example, the UMD engagement logic 130 encodes a public key in a network packet or packets transmitted to the UMD 200. Upon reading the public key, the UMD 200 responds to the RPS 100 with a key exchange to secure a secure connection between the RPS 100 and the UMD 200. In embodiments, the secure connection utilizes protocols such as transmission control protocol internet protocol (TCP/IP) or the like.

The information request logic 135 is configured to enable the RPS 100 to structure and to send the external device, such as the UMD 200, a user information request message seeking official information associated with a mobile identification credential and to transmit that request to the UMD 200 via the secure connection. The request for consent includes a request for the types of user information which the relying party is requesting by way of the RPS 100. For example, the request for consent includes a request for the user's full name.

The UMD verification logic 140 is configured to enable the RPS 100 to verify user information received from the UMD 200, as set forth above. In an embodiment, the RPS 100 accesses an electronic certificate from the APS 300 to verify the MIC user information 40 received from the UMD 200. The UMD 200 digitally signs the MIC user information 40 using the electronic certificate from the APS 300. In an embodiment, the UMD 200 retrieves the electronic certificate at the time of the transaction, either from the APS 300 or from a certificate repository. In another embodiment, the RPS 100 accesses a copy of the electronic certificate stored locally at the UMD 200, and the UMD 200 periodically refreshes the locally stored electronic certificates independently of a given transaction. In another embodiment, the verification logic is adapted to send an APS a token received from the external device, such as UMD 200, which the APS will reply to by sending the official information (i.e., the MIC user information 40).

In some instances, the RPS 100 does not have to submit anything to the APS 300 to obtain a public key. In an embodiment, the RPS 100 periodically checks with the APS 300 to refresh the public keys. In some cases, there may be a public key distributor (PKD). The distributor would be an agent acting on behalf of several trusted entities. This agent would hold the most up-to-date public keys and distribute to trusted relying parties such as RPS 100. In yet other embodiments, when something other than a public key is used to verify the MIC user information 40, the RPS 100 will need to submit an electronic document or a digital file or the like to the APS 300 in exchange for a key that may be referred to as a verification key that is not public. In an embodiment, the verification key is a public key that refreshes after a very short time, thereby requiring the RPS 100 to reach out to the APS 300 when it is time to verify the information and use the public key with a short lifespan before it expires. In other embodiments, cryptography is based on private key pairs.

The APS verification logic 145 is configured to enable the RPS 100 to verify MIC user information 40 received from the APS 300. Similar to above, the RPS 100 can access an electronic certificate authorized by the APS 300, whether stored locally or remotely, to cryptographically verify the official information received from the APS 300 that is digitally signed by the certificate used by the APS 300. In other words, the APS verification logic is adapted to receive the official information and to cryptographically verify the official information.

The memory 125 is associated with a token or file 150, a verification 155, and data 160. The RPS 100 makes use of tokens as set forth above, for trust and verification. The data 160 represents the received MIC user information 40.

Figure 4:
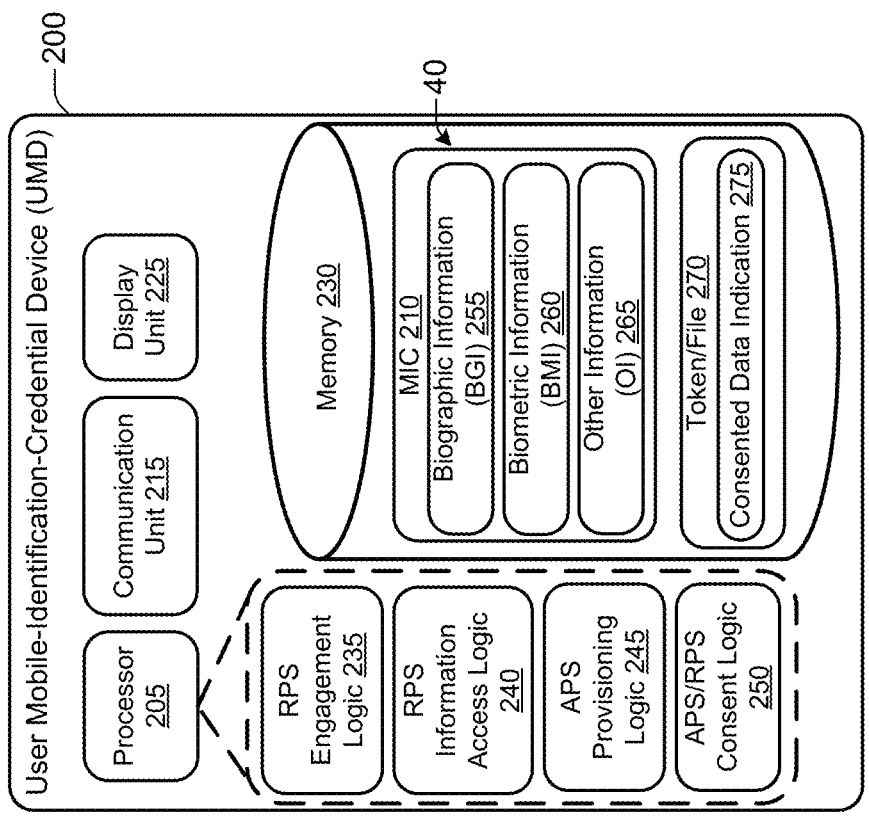
FIG. 4 illustrates a UMD according to an embodiment.

FIG. 4 illustrates a UMD 200 according to an embodiment. The UMD 200 includes a processor 205, communication unit 215, display unit 225, and memory 230. The processor 205 is associated with logic or modules to process information, including RPS engagement logic 235, RPS information access logic 240, APS provisioning logic 245, and APS/RPS consent logic 250.

In an alternate embodiment, the UMD 200 includes removable memory 230, such as a universal serial bus (USB) flash memory unit or micro secure digital (SD) flash memory card. In such embodiments, the memory 230 of the UMD 200, which contains a provisioned MIC 210, is separable from the UMD 200 or combinable with a different UMD. In another embodiment, a memory itself serves as the UMD 200. In such embodiments, a user carries a portable memory in UMD 200 containing the user's MIC 210 or user consent token or files 270. Such a portable memory in UMD 200, in embodiments, is a portable USB flash drive. To conduct a transaction or otherwise provide identification, the user inserts the portable memory into an RPS 100 (or web-enabled device through which the UMD 200 is communicating with the RPS 100), which interprets the insertion as proximal consent to read the MIC user information 40 (whether directly from the portable memory 230 to the RPS 100 in an offline mode, or indirectly by retrieving a user consent token from the portable memory and forwarding that token to an APS 300 from which the RPS 100 receives MIC user information 40). In yet another embodiment, the UMD 200 comprises a code, such as an electrically-readable code via magnet, RFID, and the like, or an optically readable code such as barcode, QR code, and the like. In such embodiments, the user conducts a transaction or otherwise provides identification by presenting the code to an RPS 100 including a reader compatible with the code's format. In an embodiment, the RPS 100 includes a keyboard that the user uses to manually type the code. In another embodiment, the RPS 100 includes a card reader to read the code contained in or on a card-format UMD, whether electronically, magnetically, or optically encoded on the card. The RPS reader can verify such identities by using those forms of identity to retrieve biometric information from the APS 300 and performing a comparison with the user to verify that the MIC 210 belongs to that user.

The RPS engagement logic 235 is configured to enable the UMD 200 to establish the secure connection with the RPS 100, as set forth above with respect to the description of FIG. 3.

The RPS information access logic 240 is configured to enable the UMD 200 to allow the RPS 100 to access the MIC user information 40 associated with the MIC 210 (whether stored at the UMD 200 for offline mode access or stored at the APS 300 for online mode access). In the context of allowing access to MIC user information 40 stored on the UMD 200, passive access involves the UMD 200 enabling the RPS 100 to read data from the UMD 200. Active access involves the UMD 200 transmitting data to the RPS 100. Allowing access furthermore includes the UMD 200 authorizing release of MIC user information 40 from the APS 300 to the RPS 100, which similarly involves passive or active access between the RPS 100 and the APS 300. The RPS information access logic 240 is responsive to the UMD information request logic 135, as set forth above with respect to the description of FIG. 3.

The APS provisioning logic 245 is configured to enable the UMD 200 to receive a MIC 210 from the APS 300 and store the received MIC 210 securely on the UMD 200. The APS provisioning logic 245 is responsive to the MIC generator 325 as set forth above and as described with respect to FIG. 2. In an embodiment, the APS provisioning logic 245 communicates with the APS 300 to indicate readiness for provisioning the MIC 210 from the APS 300 onto the UMD 200. In embodiments, the APS provisioning logic 245 is configured to provision multiple MICs 210 onto the UMD 200. For example, the APS provisioning logic 245 provisions a first MIC 210 corresponding to an mDL, and a second MIC 210 corresponding to an employment ID. The UMD 200 stores the MIC 210 in the memory 230 as illustrated, including the various information of the MIC 210 such as the BGI 255, BMI 260, and OI 265.

The APS/RPS consent logic 250 is configured to enable the UMD 200 to receive requests for the consent and release of MIC user information 40. The APS/RPS consent logic 250 is configured to generate, responsive to received requests, corresponding compartmentalized or discrete prompts for the user's consent to selectively indicate approval to release such MIC user information 40. In an example, the APS/RPS consent logic 250 is configured to interact with the UMD information request logic 135, as set forth above and described with respect to FIG. 3. In an embodiment, the APS/RPS consent logic 250 receives the user's selective consent and sends the consent to the APS 300 whereby the APS 300 acts in accordance with the consent. In another embodiment, the APS/RPS consent logic 250 receives the user's selective consent and directs the UMD 200 to selectively release the MIC user information 40 in accordance with the consent.

The memory 230 is associated with at least one MIC 210 and token or file 270. The MIC 210 includes MIC user information 40 such as biographic information (BGI) 255, biometric information (BMI) 260, and other information (OI) 265 such as privileges. The token or file 270 includes a consented data indication 275. In an offline embodiment, the APS/RPS consent logic 250 obtains consent and transmits the requested portion (or all) of MIC user information 40 including BGI 255, BMI 260, or OI 265 (e.g., using a secure communication link and a verification protocol to digitally sign the requested information) from the UMD 200 to the RPS 100. In an online embodiment, the APS/RPS consent logic 250 obtains consent and transmits, to the APS 300, the token or file 270 (as stored in the memory) which contains a consented data indication 275. The token or file 270 does not actually contain the requested portion of MIC user information 40. Rather, the token or file 270 includes the consented data indication 275 which indicates which of the user's MIC user information 40 is authorized for release by the APS 300. Such consented data indication 275 is used by the RPS 100. The RPS 100 passes the received consented data indication 275 (e.g., as an RPS token) to the APS 300, which exchanges the token or file 270 for the MIC user information 40 at the APS 300 that is consented to be released. The APS 300 then releases to the RPS 100 (e.g., allows access by the RPS 100) the consented MIC user information 40. In embodiments, the RPS uses tokens to engage two APSs, or uses two separate public keys to authenticate data from two different issuing authorities.

Figure 5:
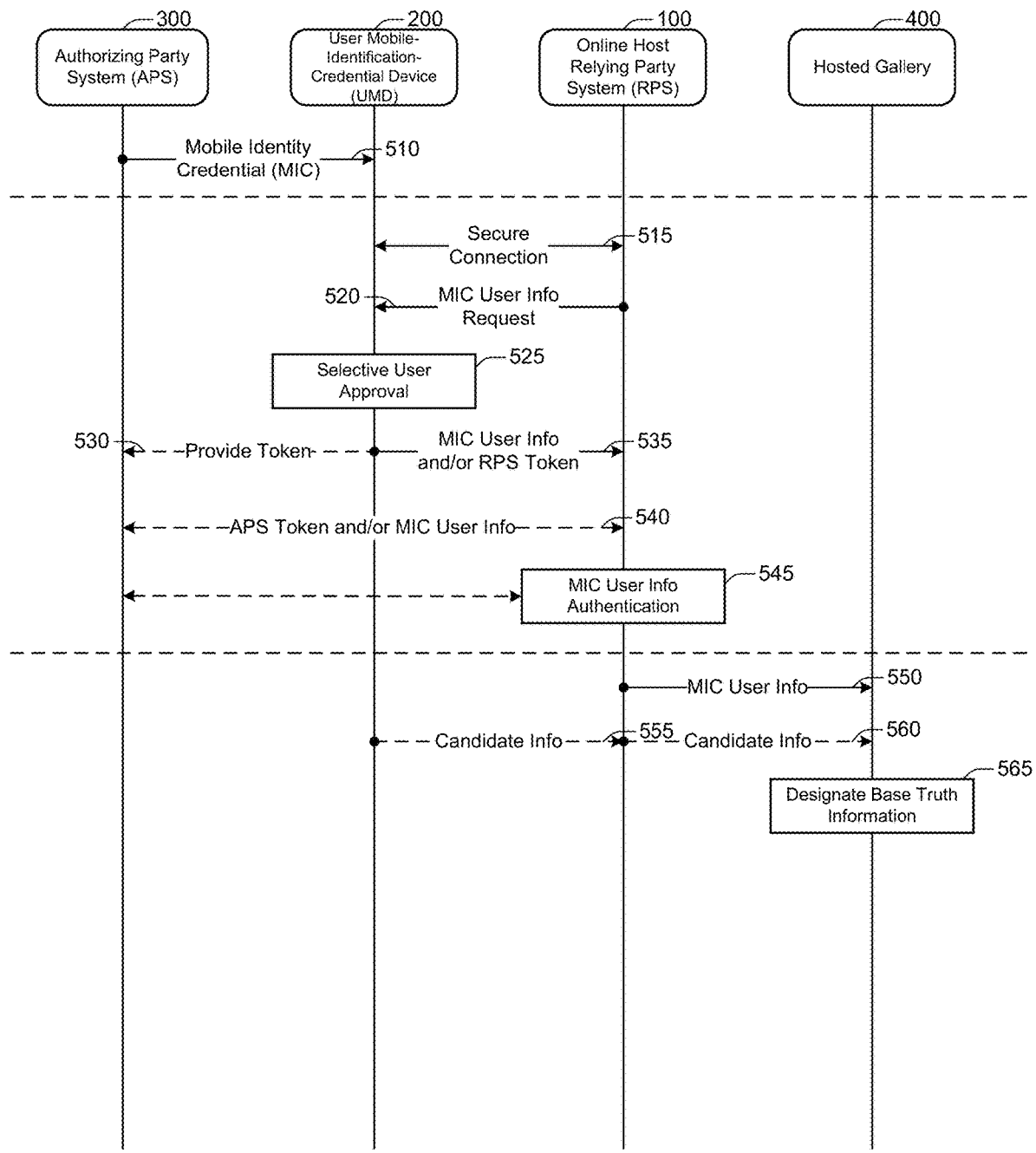
FIG. 5 illustrates steps to obtain MIC user information and candidate information according to an embodiment.

FIG. 5 illustrates steps to obtain MIC user information and candidate information according to an embodiment, based on communications between an APS 300, UMD 200, RPS 100, and hosted gallery 400. Initially, the APS 300 provisions 510 a MIC onto the UMD 200, as described above. The user then establishes 515 a secure connection between their UMD 200 and the online host serving as the RPS 100, e.g., via the Internet.

To establish 515 the secure connection, in an embodiment, the user interacts with the RPS 100 by using the UMD 200 to perform an initiation with the RPS 100. The UMD 200 and RPS 100 perform a handshake establishing a secure connection between the UMD 200 and RPS 100. The handshake and secure connection are implemented according to various embodiments and are initiated by either device. In an embodiment, the handshake and connection are based on TCP/IP.

In an embodiment (e.g., as part of establishing 515 the secure connection), the RPS 100 is configured to request a liveness check from the UMD 200, as described above. Due to the nature of the secure connection as established through the handshake, the trustworthiness of information from the UMD 200 responsive to the request is preserved.

Following the establishment 515 of the secure connection, the online host serving as the RPS 100 sends to the UMD 200 a request 520 for MIC user information. Such a request can involve a request to furnish the user's identity or other MIC user information, such as an authorized identity photograph from the MIC. The request 520 for MIC user information can be selectively tailored to request or receive only that information for which the user has granted permission to the host serving as the RPS 100 for 1) verifying candidate information that is to be, or already has been, uploaded by the user for serving as base truth information or photograph, or 2) obtaining MIC user information that will be serving as the base truth information or photograph (biographic or biometric). Accordingly, the scope of the various requests is custom tailored for a given use or type of online host, ensuring that the privacy of the user is maximized.

Responsive to receiving the MIC user information request message, the UMD 200 prompts the user for selective approval 525 to release MIC user information corresponding to the credential request. In the above example, the credential request corresponds to a request by the online host serving as the RPS 100 for the user's information sufficient to establish base truth information stored at the online host serving as the RPS 100 (e.g., as part of the hosted gallery 400). Accordingly, the UMD 200 displays a prompt requesting the user's permission to release, from the UMD 200 to the RPS 100, MIC user information such as the user's photograph, full name, and age as contained in the MIC on the UMD 200.

In an online embodiment, upon granting consent at the UMD 200, the UMD 200 proceeds to provide 530 a token to the RPS 100 and to release 535 a token to the APS 300. In the online embodiment, APS payload delivery takes place during APS-RPS exchange 540 and delivers a file or files that are relatively larger or much larger than the tokens provided or released by UMD 200. In contrast to the online mode, in an offline mode embodiment, the UMD releases 535 such MIC user information directly from the UMD 200 to the RPS 100. The APS 300 digitally signs or encrypts the MIC user information being released, allowing for verification 545 of the MIC user information by the RPS 100.

Upon receipt of the MIC user information (whether via online or offline mode), the RPS 100 verifies 545 the MIC user information via the signature using a digital certificate from the APS 300, or decrypts the payload using the public key of the APS 300.

The verified MIC user information, such as the MIC user information photograph and full name, is sent 550 to a hosted gallery 400 of the online host serving as the RPS 100. Such verified information is used, in an embodiment, as base truth information for the user. The online host serving as the RPS 100 can then compare the base truth information to other purported user photographs already stored or subsequently uploaded to the hosted gallery 400. If the comparison matches to within a threshold (e.g., based on image matching, facial recognition, or other techniques for identifying matches of the same user in photographs), the online host serving as the RPS 100 verifies the matching photograph or photographs as genuinely representing the user. In another embodiment, the online host serving as the RPS 100 enables the user to selectively control whether the base truth information is publicly viewable. For example, the base truth information may be a MIC user information photograph of the user that is relatively old and unflattering. However, even though the user may not want to display such a photograph in the hosted gallery 400, the photograph serves a valuable purpose in enabling the online host to verify other photographs, whether stored in the hosted gallery 400, stored elsewhere on the online host serving as the RPS 100, or stored on other hosts, or submitted as candidate information yet to be uploaded.

In embodiments, the UMD 200 uploads 555 candidate information, such as uploads of a user selfie and a user resumé. The online host serving as the RPS 100 deems such uploads 555 of candidate information trustworthy by virtue of the MIC environment having established the trustworthiness of the UMD and MIC user information. The online host serving as the RPS 100 then stores 560 the candidate information on a hosted gallery 400. As with the selective hiding or displaying of the MIC user information, the online host serving as the RPS 100 also enables a user to designate whether a given piece of candidate information or photograph is to be hidden or displayed publicly, e.g., as part of a hosted gallery 400.

Figure 6:
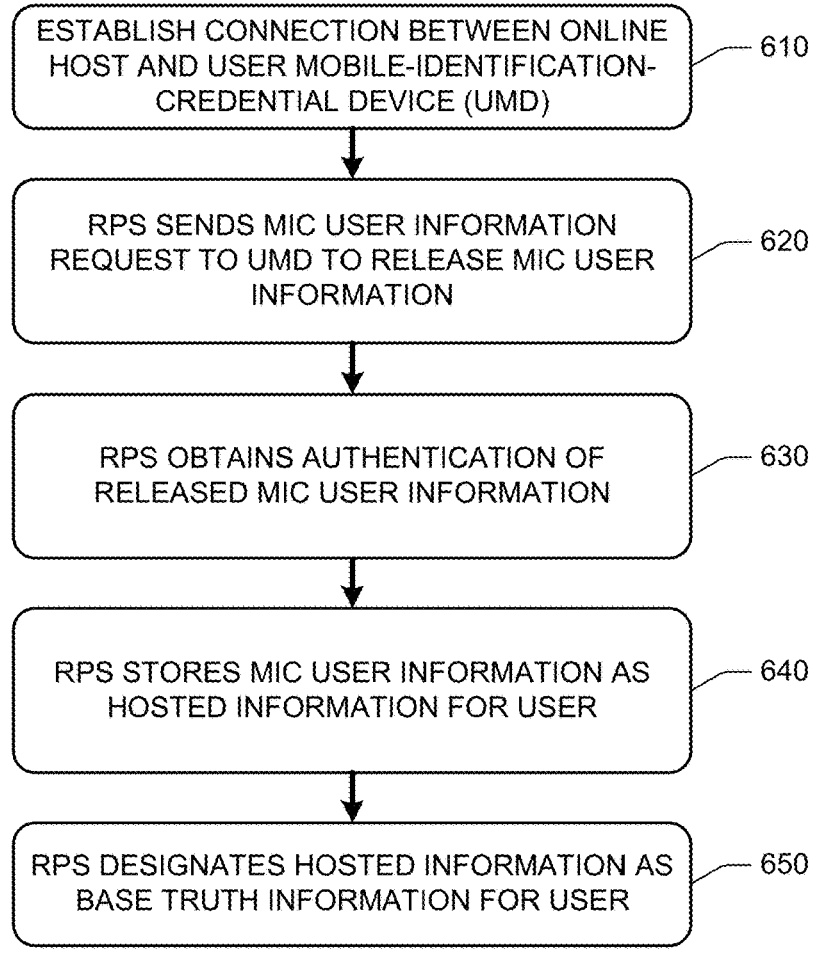
FIG. 6 illustrates a method of designating base truth information at an online host RPS according to an embodiment.

FIG. 6 illustrates a method 600 of designating base truth information at an online host RPS according to an embodiment. In block 610, the online host RPS establishes a connection with a UMD. For example, the connection is established over the Internet via cellular network technology, Wi-Fi, local area networks (LANs), and the like.

In block 620, the online host RPS sends a MIC user information request message to the UMD requesting release of the MIC user information. For example, the online host RPS requests release of the user's authorized identity photograph and full name. In an embodiment, to obtain consent for release of MIC user information, the UMD displays a prompt to its user identifying which MIC user information is requested by the online host RPS. In another embodiment, the user is prompted, via the UMD, to independently and discretely approve each type of MIC user information request.

In block 630, the online host RPS obtains verification of the MIC user information received in response to the MIC user information request. For example, the UMD digitally signs MIC user information using an electronic certificate, prior to sending the MIC user information to the online host RPS. The online host RPS accesses an electronic certificate or decryption key to verify or decrypt the signed MIC user information.

In block 640, the online host RPS stores the MIC user information as hosted information for the user. For example, the online host RPS locates a hosted gallery designated by the user and adds the submitted MIC user information to the hosted gallery. The online host RPS allows the user to designate whether to display the submitted MIC user information publicly as part of the hosted gallery, or to hide the submitted MIC user information.

In block 650, the online host RPS designates the hosted information as base truth information for the user. In an example, the base truth information enables the host to verify whether other images of the hosted gallery genuinely represent the user.

Figure 7:
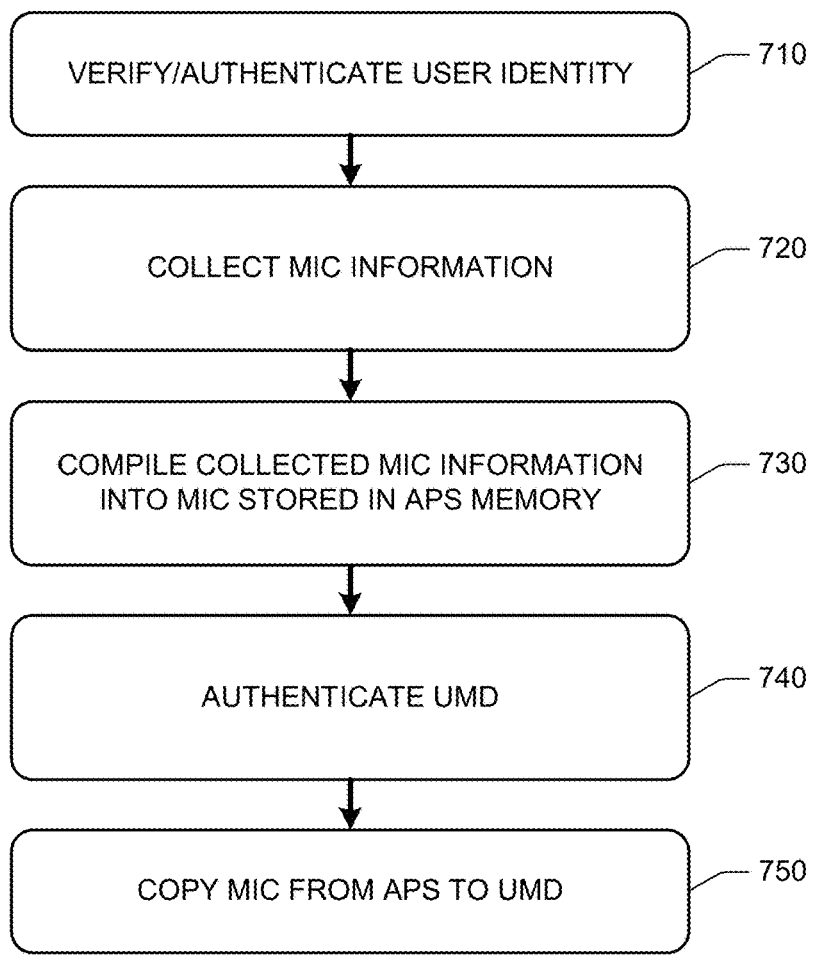
FIG. 7 illustrates a method of generating a MIC as performed by the APS according to an embodiment.

FIG. 7 illustrates a method 700 of generating a MIC as performed by the APS according to an embodiment. Such method is performed by the example MIC generator illustrated in FIG. 2. Generally, embodiments of the MIC generator handle creation or provisioning of the MIC, and support in-person and remote provisioning of the MIC onto the UMD.

In block 710, the MIC generator obtains proof of identity for the user whose MIC is to be generated. Such proof is provided via collected and verified information about the user, such as a birth certificate, social security card, proof of residency, or other identity-related documents for proving or otherwise verifying identity, as explained above.

In block 720, the MIC generator collects MIC information related to the MIC that is to be generated. For example, the MIC generator collects, from the APS, verified user biographic information such as name and address, and biometric information such as photograph and fingerprints, which will be part of the MIC. The APS provides such biometric information to the MIC generator as needed, e.g., by collecting the user's fingerprints or iris scan, taking the user's photograph, or the like. Additionally, the MIC generator collects from the APS other information, such as privileges, that relate to the MIC that is to be provisioned onto the UMD.

In block 730, the MIC generator compiles the collected MIC information into a MIC that is stored in the memory of the APS. In an embodiment, the MIC is one of multiple MICs comprising a database of MICs stored in the memory of the APS. In embodiments, the stored MIC is available for provisioning onto the UMD and is available to satisfy verification requests from RPS requesting MIC information from the APS according to an online mode.

In block 740, the MIC generator verifies suitability of the UMD on which the MIC will be provisioned. In an embodiment, the APS performs device identification and verification by interfacing with the UMD to retrieve device-specific identity information from the UMD, such as the manufacturer and model of the user's UMD. The APS checks whether the UMD manufacturer and model information are on a list of acceptable UMDs. In embodiments, such interfacing is carried out via secure wired or wireless connections between the APS and the UMD. In another embodiment, the MIC generator of the APS interfaces with the UMD to identify and verify the UMD in a secure fashion facilitated by an electronically readable and cryptographically protected chip embedded in the UMD. In another embodiment, the APS performs a multi-factor verification of the UMD to identify and verify the UMD. Verifying or identifying the UMD enables the MIC generator to verify that the UMD is compatible with and approved for use with the MIC environment, including provisioning a MIC onto the UMD.

In block 750, the MIC generator copies the MIC from APS memory to the UMD. In an embodiment, the MIC is copied via the secure wired or wireless connection between the APS and the UMD used to verify the UMD. In another embodiment, the MIC is remotely provisioned onto the UMD over a remote secure connection, such as via the Internet. Such connections or transferred data are secured by encryption or other technological protections as explained above. The MIC generator can read the copied MIC from the UMD, and compare the UMD copy of the MIC to the APS copy of the MIC, to verify successful data transfer.

Figure 8:
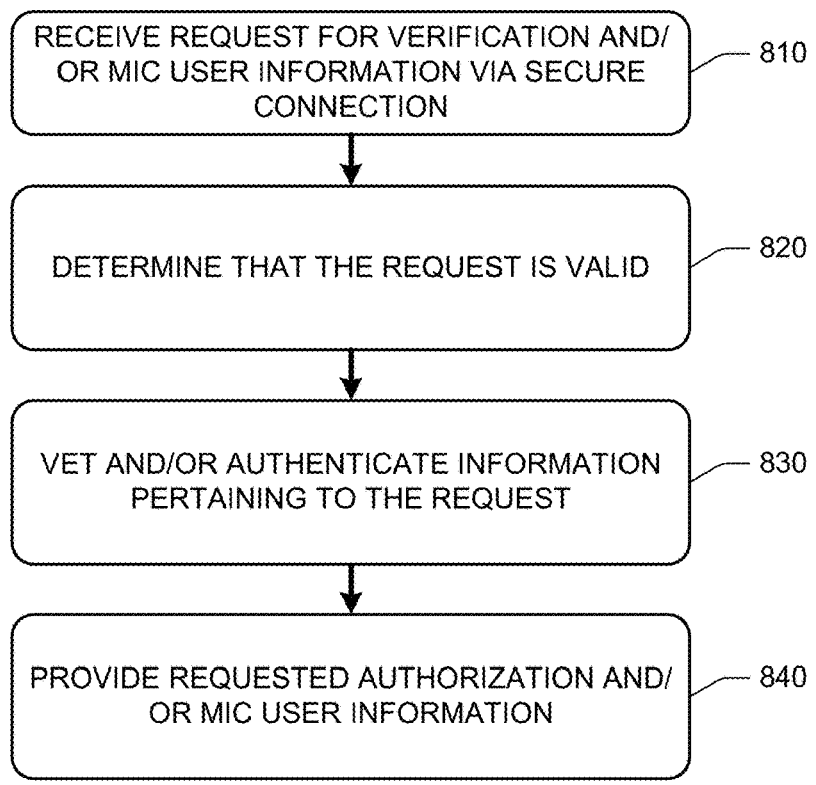
FIG. 8 illustrates a method of verification as performed by the APS according to an embodiment.

FIG. 8 illustrates a method 800 of verification as performed by the APS according to an embodiment. Such method is performed by the example verification system illustrated in FIG. 2 as explained above.

In block 810, the verification system receives a request for verification or MIC user information via a secure connection. The APS establishes secure connections consistent with the various example secure connections as provided throughout the disclosure in the context of other examples presented herein. In an embodiment, the verification system establishes the secure connection in response to a request.

In block 820, the verification system determines that the request is valid. In an embodiment, the request is for the APS to verify a transaction, and the APS verifies the transaction by verifying one or more elements used to carry out the transaction. For example, the APS verifies that an APS certificate used in a transaction is valid, or verifies information using public key cryptography. Such verification involves verifying the connections, data transfers, or data itself.

In block 830, the verification system verifies the information pertaining to the request. In an embodiment, the verification system communicates with an end system to determine whether the requested information pertains to a user having restricted online rights (e.g., found on a sex offender registry or a crimes against minors registry) or other pertinent information stored on the back-end system. In another embodiment, the verification system communicates with other servers, APSs (e.g., a governmental source such as a DMV), back ends, or other systems to cross-reference received information against other authoritative sources or copies of MIC user information locally stored at the APS.

In block 840, the verification system provides the requested authorization or MIC user information. In an embodiment, the verification system provides affirmative confirmation, e.g., a digitally signed token, that indicates that the requested authorization is granted. In another embodiment, the verification system provides affirmative confirmation, e.g., a digitally signed token, that the MIC user information pertaining to the request is verified.

Figure 9:
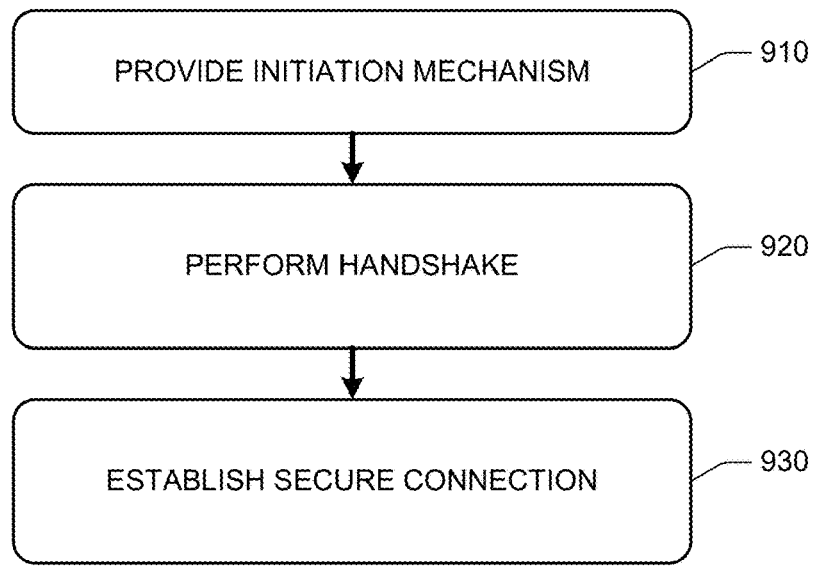
FIG. 9 illustrates a method of UMD engagement as performed by the RPS according to an embodiment.

FIG. 9 illustrates a method 900 of UMD engagement as performed by the RPS according to an embodiment. Such method is performed by the example UMD engagement logic illustrated in FIG. 3. Generally, the UMD engagement logic establishes a secure connection between the RPS and the UMD, which is used for secure communications and data transfers between the RPS and the UMD.

In block 910, the RPS provides an initiation mechanism. For example, the RPS provides a server accessible via internet that waits to receive connections from UMDs. In block 920, the RPS and UMD perform a handshake. In an embodiment, the handshake is performed in response to the initiation of the secure connection described above. The secure handshake is performed, e.g., via a cryptographic key exchange such as a Diffie-Hellman key exchange and enables the RPS to establish the secure connection with the UMD. In block 930, the RPS and UMD establish a secure connection. The secure connection enables the RPS and UMD to exchange information securely. The secure connection enables exchange of requests or responses, tokens, and MIC user information. In an embodiment, the initiation mechanism, handshake, and secure connection are based on TCP/IP protocols over the Internet.

Figure 10:
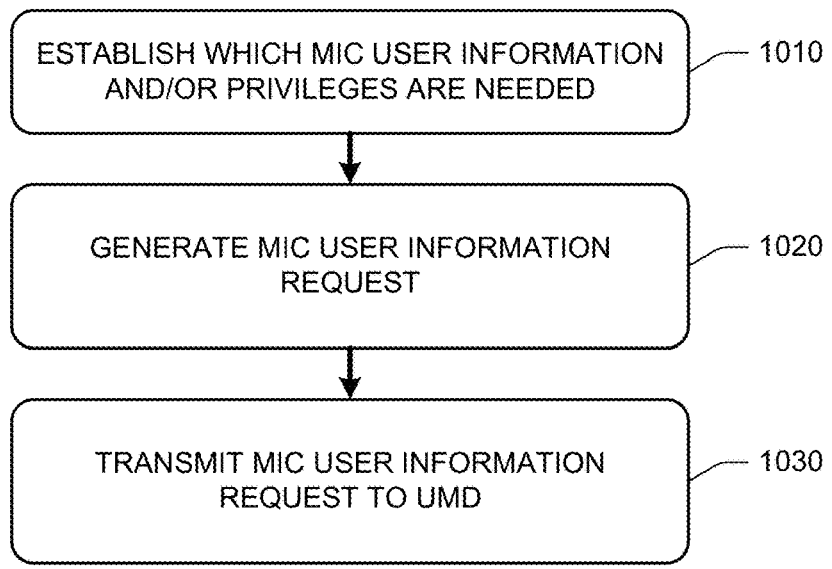
FIG. 10 illustrates a method of UMD information request as performed by the RPS according to an embodiment.

FIG. 10 illustrates a method 1000 of UMD information request as performed by the RPS according to an embodiment. Such a method is performed by the example UMD information request logic illustrated in FIG. 3. Generally, the RPS needs information from the UMD, which the RPS uses for verifying candidate information uploaded by the UMD. In an embodiment, the RPS serving as an online host needs identity information from the user's UMD, in order to verify the identity of the user, and also to verify candidate information.

In block 1010, the RPS establishes which MIC user information the RPS needs from the UMD. In an embodiment, such a determination takes into account the type of candidate information (i.e., the candidate information type) the user is verifying. The online host RPS may host a professional social network, requesting from the UMD the user's MIC user information photograph, full name, and resumé, based on the RPS establishing that the needed information is commensurate with verifying a given type of candidate information.

In block 1020, the RPS generates the MIC user information request. In an embodiment, the RPS constructs the request as a data structure, such as a token or file, that is stored in the memory of the RPS. The RPS constructs the user information request in a manner that the UMD is able to act on, e.g., to identify which specific aspects of the MIC user information (or other information such as candidate information) are needed by the RPS. The user information request is also structured to enable the UMD to selectively consent to release of one or more of the particular compartmentalized portions of the user information request. For example, the UMD approves release of a name request contained in the user information request, while not approving release of a social security number request contained in the user information request.

In block 1030, the RPS transmits the user information request to the UMD. In an embodiment, the RPS and UMD exchange such information via the secure connection established as set forth above.

Figure 11:
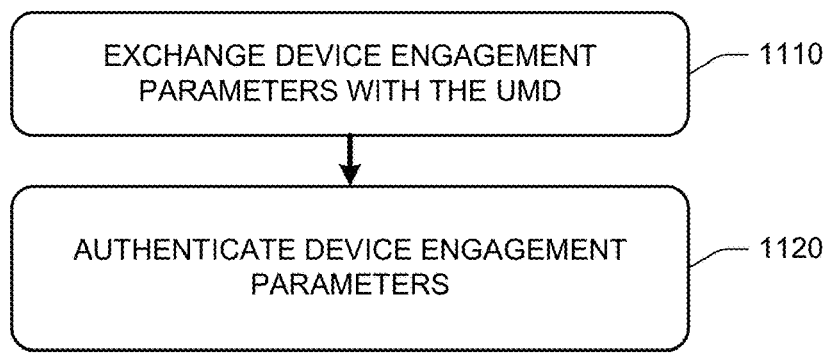
FIG. 11 illustrates a method of UMD verification as performed by the RPS according to an embodiment.

FIG. 11 illustrates a method 1100 of UMD verification as performed by the RPS according to an embodiment. Such method is performed by the example UMD verification logic illustrated in FIG. 3. Generally, the RPS verifies that it is communicating with a legitimate UMD, as part of ensuring that information to or from the UMD is trustworthy.

In block 1110, the RPS exchanges device engagement parameters with the UMD. Such exchange is similar to the exchanges as set forth above with respect to FIG. 9 regarding establishing the secure connection.

In block 1120, the RPS verifies the device engagement parameters. For example, the RPS confirms that the token or information received from the UMD is authorized by the APS, using encryption or other technological protections as described above.

Figure 12:
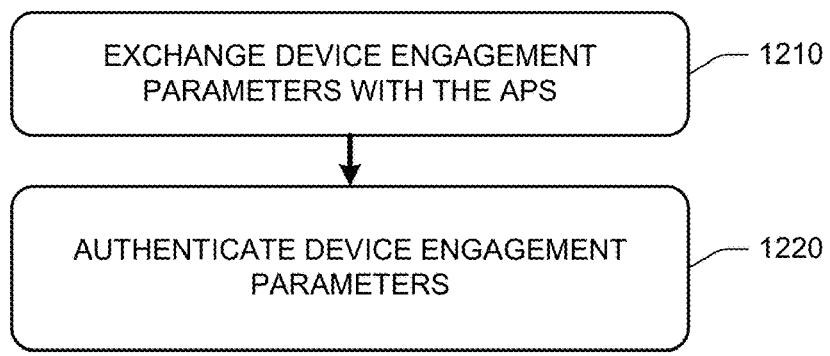
FIG. 12 illustrates a method of APS verification as performed by the RPS according to an embodiment.

FIG. 12 illustrates a method 1200 of APS verification as performed by the RPS according to an embodiment. Such method is performed by the example APS verification logic illustrated in FIG. 3. Generally, the RPS verifies that it is communicating with a legitimate APS, as part of ensuring that information to or from the APS is trustworthy.

In block 1210, the RPS exchanges device engagement parameters with the APS. Such exchange is similar to the exchanges as set forth above with respect to FIG. 9 regarding establishing the secure connection. Furthermore, in embodiments, the exchange involves parameters that enable the RPS to verify that the APS is part of an acceptable MIC environment, as explained above.

In block 1220, the RPS verifies the device engagement parameters. For example, the RPS confirms that the token or information received from the APS matches publicly available or trustworthy APS certificates, e.g., by examining the digital signature of the token or information, or by decrypting the token or information using a trusted public key of the APS (whether locally stored, or available from a trusted certificate repository).

Figure 13:
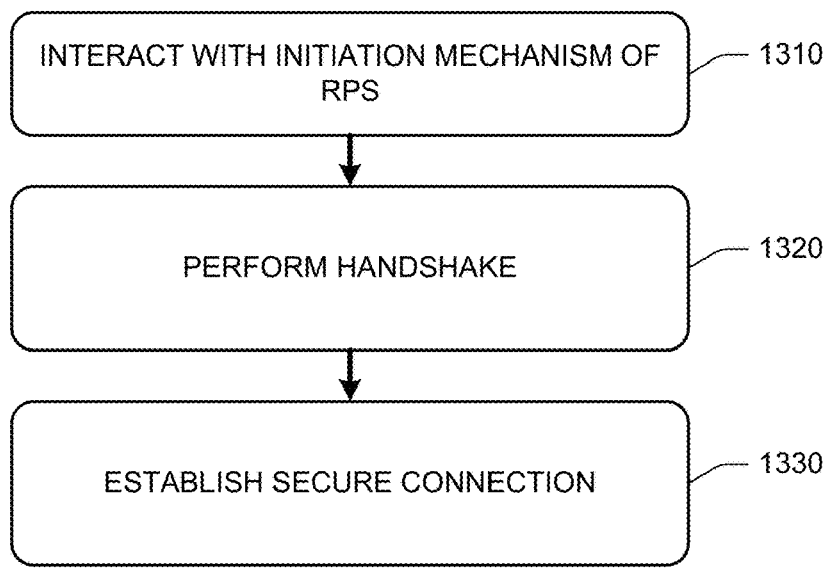
FIG. 13 illustrates a method of RPS engagement as performed by the UMD according to an embodiment.

FIG. 13 illustrates a method 1300 of RPS engagement as performed by the UMD according to an embodiment. Such method is performed by the example RPS engagement logic illustrated in FIG. 4. Generally, the RPS engagement logic corresponds to the UMD engagement logic as set forth above with respect to FIG. 9, but from the perspective of the UMD instead of the RPS. The RPS engagement logic generally establishes a secure connection between the UMD and the RPS, which is used for secure communications and data transfers between the UMD and the RPS.

In block 1310, the UMD interacts with an initiation mechanism of the RPS. The initiation mechanism provided by the RPS enables the UMD to initiate a connection with the RPS. In an embodiment, the RPS provides a server accessible via internet that waits to receive connections from UMDs. In block 1320, the RPS and UMD perform a handshake. In an embodiment, the handshake is performed in response to the initiation of the secure connection described above. The secure handshake is performed, e.g., via a cryptographic key exchange such as a Diffie-Hellman key exchange and enables the RPS to establish the secure connection with the UMD. In block 1330, the RPS and UMD establish a secure connection. The secure connection enables the RPS and UMD to exchange information securely. The secure connection enables exchange of requests or responses, tokens, and MIC user information. In an embodiment, the initiation mechanism, handshake, and secure connection are based on TCP/IP protocols over the internet.

Figure 14:
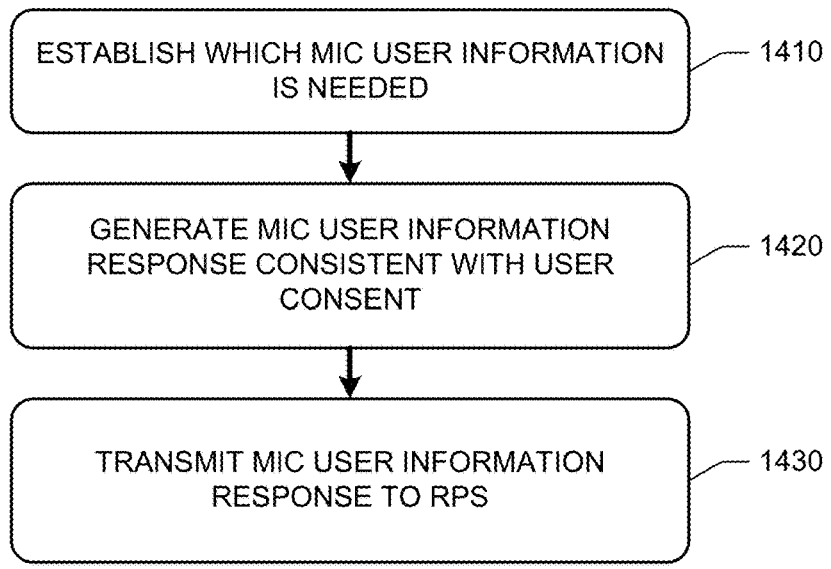
FIG. 14 illustrates a method of RPS information access as performed by the UMD according to an embodiment.

FIG. 14 illustrates a method 1400 of RPS information access as performed by the UMD according to an embodiment. Such method is performed by the example RPS information access logic illustrated in FIG. 4. Generally, the RPS information access logic is responsive to the UMD information request logic as set forth above with respect to FIG. 10, but from the perspective of the UMD instead of the RPS. In an embodiment, the RPS serving as an online host needs identity MIC user information (from the user's UMD in offline mode, or from the APS in online mode), in order to verify the candidate information uploaded by the user.

In block 1410, the UMD establishes which MIC user information or privileges the RPS needs from the UMD. In an embodiment, such determination takes into account what is the type of candidate information the user is verifying. The online host RPS may host a professional social network, requesting from the UMD the user's MIC user information photograph, full name, and resumé, based on the RPS establishing that the needed information is commensurate with verifying a given type of candidate information.

In block 1420, the UMD generates the MIC user information response, which is potentially responsive to the user information request from the RPS (depending on user consent). In an embodiment, the UMD constructs the response as a data structure, such as a token or file, that is stored in the memory of the UMD.

In block 1430, the UMD transmits the user information response to the RPS. In an embodiment, the UMD and RPS exchange such information via the secure connection established as set forth above.

Figure 15:
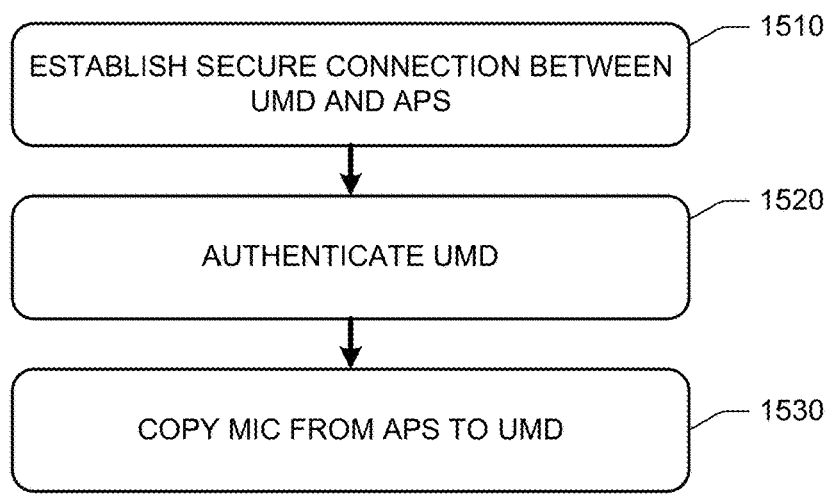
FIG. 15 illustrates a method of APS provisioning as performed by the UMD according to an embodiment.

FIG. 15 illustrates a method 1500 of APS provisioning as performed by the UMD according to an embodiment. Such method is performed by the example APS provisioning logic illustrated in FIG. 4. Generally, the APS provisioning logic is responsive to the MIC generator as set forth above with respect to FIG. 7, but from the perspective of the UMD instead of the APS. Embodiments of the APS provisioning logic handle receiving or provisioning of the MIC from the APS onto the UMD, and support in-person and remote provisioning of the MIC onto the UMD.

In block 1510, APS provisioning logic directs the UMD to establish a secure connection with the APS, as explained above.

In block 1520, the APS provisioning logic directs the UMD to verify the APS that is to provision the MIC onto the UMD. In an embodiment, the APS provisioning logic of the UMD responds to the APS performing device identification and verification, as explained above.

In block 1530, the APS provisioning logic directs the UMD to receive a copy of the MIC, copied by the APS from APS memory to secure or encrypted local memory of the UMD as explained above.

Figure 16:
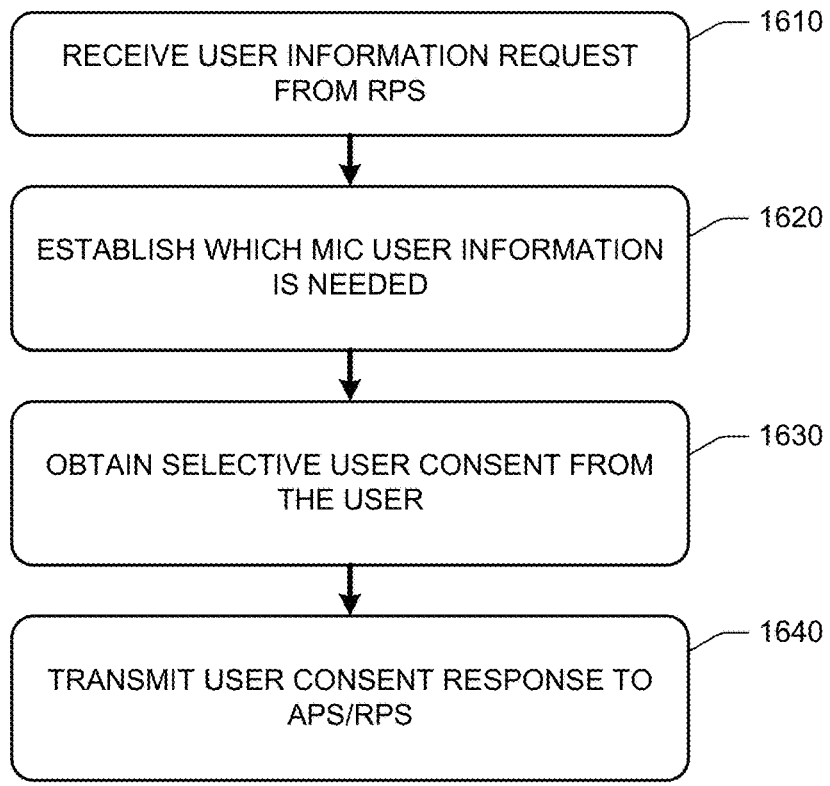
FIG. 16 illustrates a method of APS/RPS consent as performed by the UMD according to an embodiment.

FIG. 16 illustrates a method 1600 of APS/RPS consent as performed by the UMD according to an embodiment. Such method is performed by the example APS/RPS consent logic illustrated in FIG. 4. Generally, the APS/RPS consent logic corresponds to the UMD information request logic as set forth above with respect to FIG. 10, but from the perspective of the UMD instead of the RPS. The APS/RPS consent logic generally enables the user in possession of the UMD to selectively consent to release of MIC user information, whether requested directly from the UMD (offline mode), or whether granting access to the MIC user information as stored on and retrieved directly from the APS (online mode).

In block 1610, the UMD receives a user information request from the RPS. In an embodiment, the UMD receives the user information request from the RPS via the secure connection established between the RPS and UMD as explained above.

In block 1620, the UMD establishes which MIC user information or privileges the RPS needs from the UMD. In an embodiment, the APS/RPS consent logic digests the received user information request from the RPS to extract and determine which particular fields, corresponding to particular compartmentalized MIC user information, to which the user needs to selectively grant or withhold consent for release. In an online host RPS embodiment, the RPS user information request indicates a need for the user's photograph, full name, and date of birth.

In block 1630, the APS/RPS consent logic directs the UMD to obtain selective user consent from the user. In embodiments, the APS/RPS consent logic is also referred to as a privacy dialog. In an embodiment, the UMD is a mobile device that has user interface logic that enables a user interface controller to provide a user interface. The APS/RPS consent logic directs the smartphone user interface to display a prompt that identifies the user information request and prompts for consent to portions of the user information request. For example, the APS/RPS consent logic directs the user interface to prompt "Consent to release date of birth to online host Yes/No?" The APS/RPS consent logic receives the user's response and continues to prompt for the remainder of additional needed MIC user information. Accordingly, the APS/RPS consent logic collects the various selective responses to the various corresponding prompts for different aspects of consent, and packages such responses into a user consent response. In an embodiment, the user consent response serves as a user consent token, which the RPS passes to the APS to retrieve corresponding MIC user information (e.g., in an online mode). In another embodiment, the APS/RPS consent logic combines multiple requests into a single prompt, for example, where the multiple different types of consent are needed, and if not all types are received, the transaction fails. In the online host embodiment, the APS/RPS consent logic displays a single prompt asking the user to consent to release all specified MIC user information that is required by a given online interaction in order to allow the user to upload a given type of candidate information particular to that type of online host. For example, the APS/RPS consent logic directs the UMD to display "Consent to release photograph, full name, and date of birth to online host Yes/No?" In other embodiments, the RPS specifies which types of consent prompts are combined. In an embodiment, the UMD displays such combination prompts, while allowing the user to maintain selective consent responses.

In block 1640, the APS/RPS consent logic directs the UMD to transmit the user consent response to the APS/RPS. In an embodiment, such information is transmitted via secure connections established as set forth above.

Figure 17:
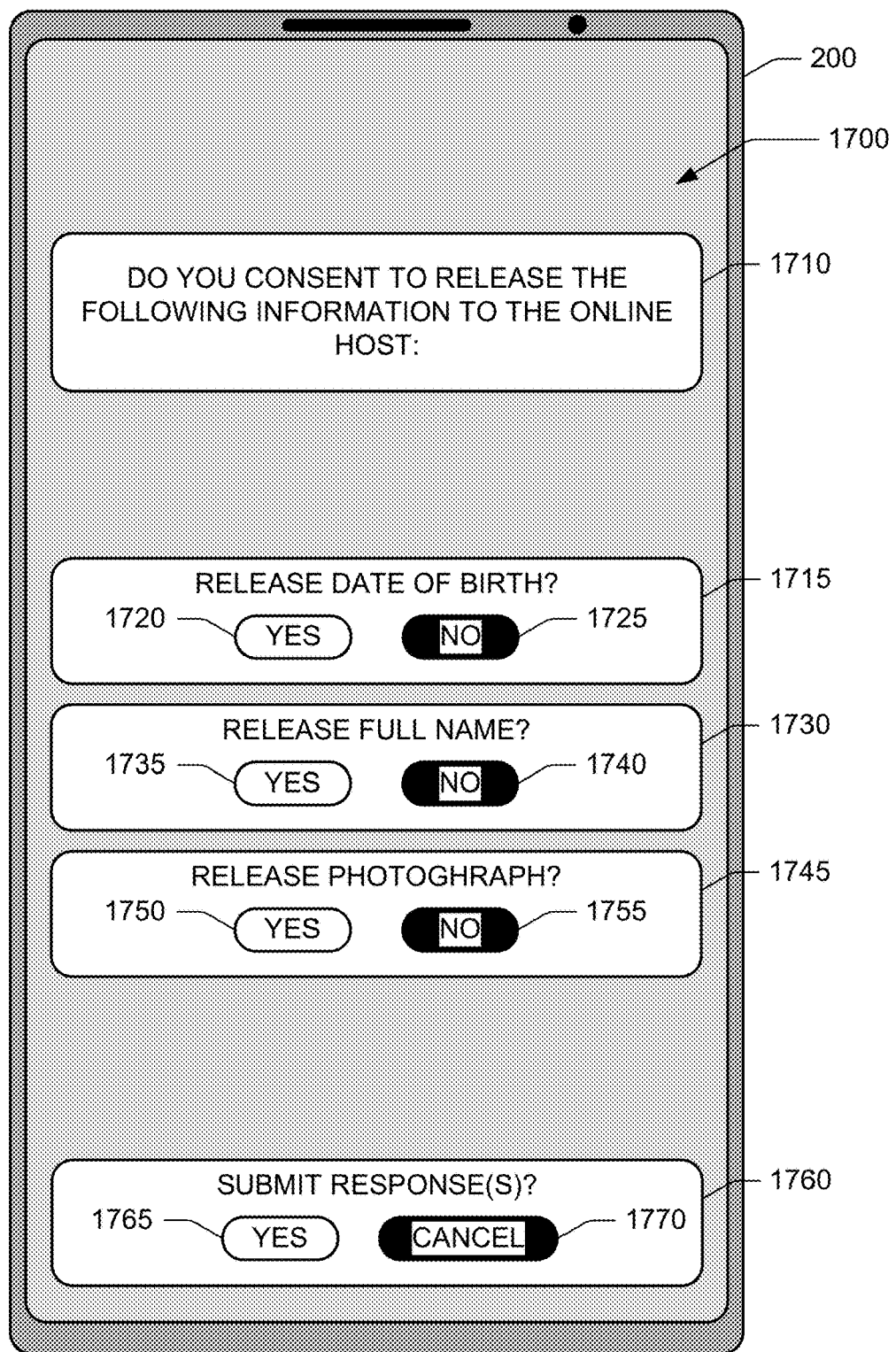
FIG. 17 illustrates a privacy dialog according to an embodiment.

FIG. 17 illustrates a privacy dialog 1700 according to an embodiment. The privacy dialog 1700 enables interaction between a user and the UMD 200, enabling the user to grant selective consent to release of MIC user information. In embodiments, the UMD 200 provides the privacy dialog 1700 via APS/RPS consent logic running on the UMD 200.

The privacy dialog 1700 includes an information prompt 1710, individual release prompts 1715, 1730, 1745, and a submit prompt 1760. The various prompts enable the user to easily view which specific MIC user information is requested by the RPS, and selectively grant consent to those prompts to which the user agrees, while selectively denying consent to those prompts to which the user disagrees. The release prompts include YES/NO radio buttons, which are illustrated in a default selection of NO to encourage a security-centric approach that protects the user's MIC user information from release by default. If the user agrees to release a given piece of MIC user information, the user selects the YES button in the release prompt corresponding to that MIC user information.

The multiple different prompts provide a readily-appreciated interface for the user to easily understand exactly which types of MIC user information the RPS is requesting be released by the UMD 200. Furthermore, the ability to selectively provide or withhold consent to different types of requests provides the user with a sense of control and feeling of safety, that only the particular, displayed, agreed-upon portion of the user's MIC information will be released.

When the various YES/NO radio buttons are configured to the user's satisfaction, the user interacts with the submit prompt 1760 to indicate that the user is ready to release the indicated selective MIC user information. As illustrated, the user presses a YES button 1765 to submit the user's selective consent as indicated in the release prompts 1715, 1730, 1745. As set forth above, the UMD 200 then releases the user consent response (e.g., as a token) or the actual MIC user information stored on the UMD 200 (e.g., in an offline embodiment). If the user does not agree to submit responses, the user presses the cancel button 1770.

Figure 18:
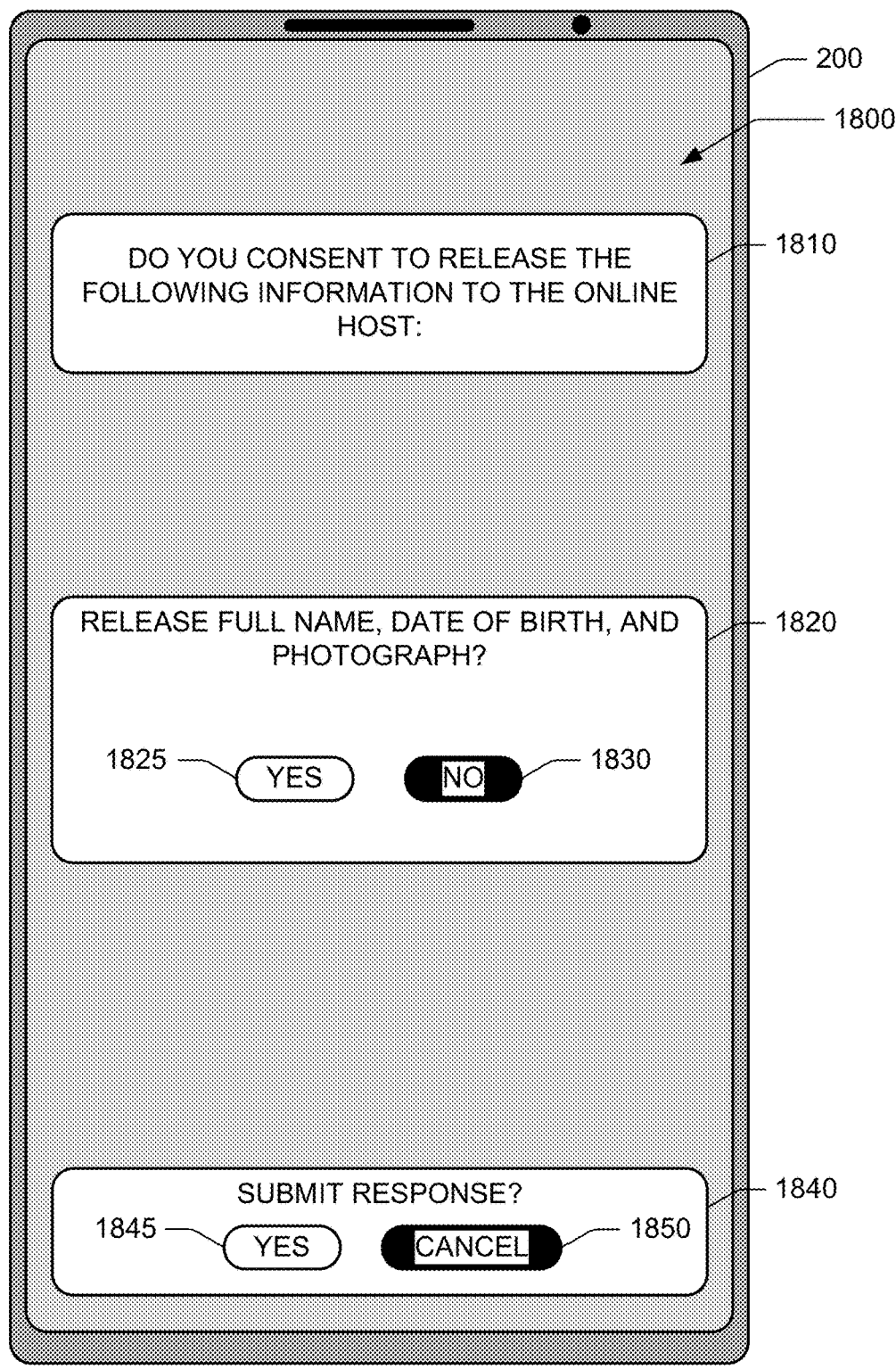
FIG. 18 illustrates a privacy dialog according to an embodiment.

FIG. 18 illustrates a privacy dialog 1800 according to an embodiment. The privacy dialog 1800 enables interaction between a user and the UMD 200, enabling the user to grant selective consent to release MIC user information. In embodiments, the UMD 200 provides the privacy dialog 1800 via APS/RPS consent logic running on the UMD 200.

The privacy dialog 1800 includes an information prompt 1810, a combination release prompt 1820, and a submit prompt 1840. The combination release prompt 1820 enables the user to easily view which specific MIC user information is requested by the RPS. Furthermore, in the illustrated embodiment, the combination release prompt 1820 serves as an indication to the user that this particular RPS requests an "all or nothing" approach to obtaining consent. In particular, the RPS is an online host that informs the user that for the particular candidate information, all three types of MIC user information are requested by the online host in order to verify the candidate information. Accordingly, the combination release prompt 1820 seeks consent to release all three types of MIC user information. Such presentation saves time for the user by needing only a single consent selection, while also communicating the nature of the RPS request being of an "all or nothing" type. The combination release prompt 1820 includes a YES/NO radio button, which is illustrated in a default selection of NO to encourage a security-centric approach that protects the user's MIC user information from release by default. If the user agrees to release the combination of MIC user information, the user selects the YES button 1825 in the combination release prompt 1820.

The user interacts with the submit prompt 1840 to indicate that the user is ready to release MIC user information. As illustrated, the user presses a YES button 1845 to submit the user's combination consent as indicated in the combination release prompt 1820. If the user does not agree to submit, the user presses the cancel button 1850.

Figure 19:
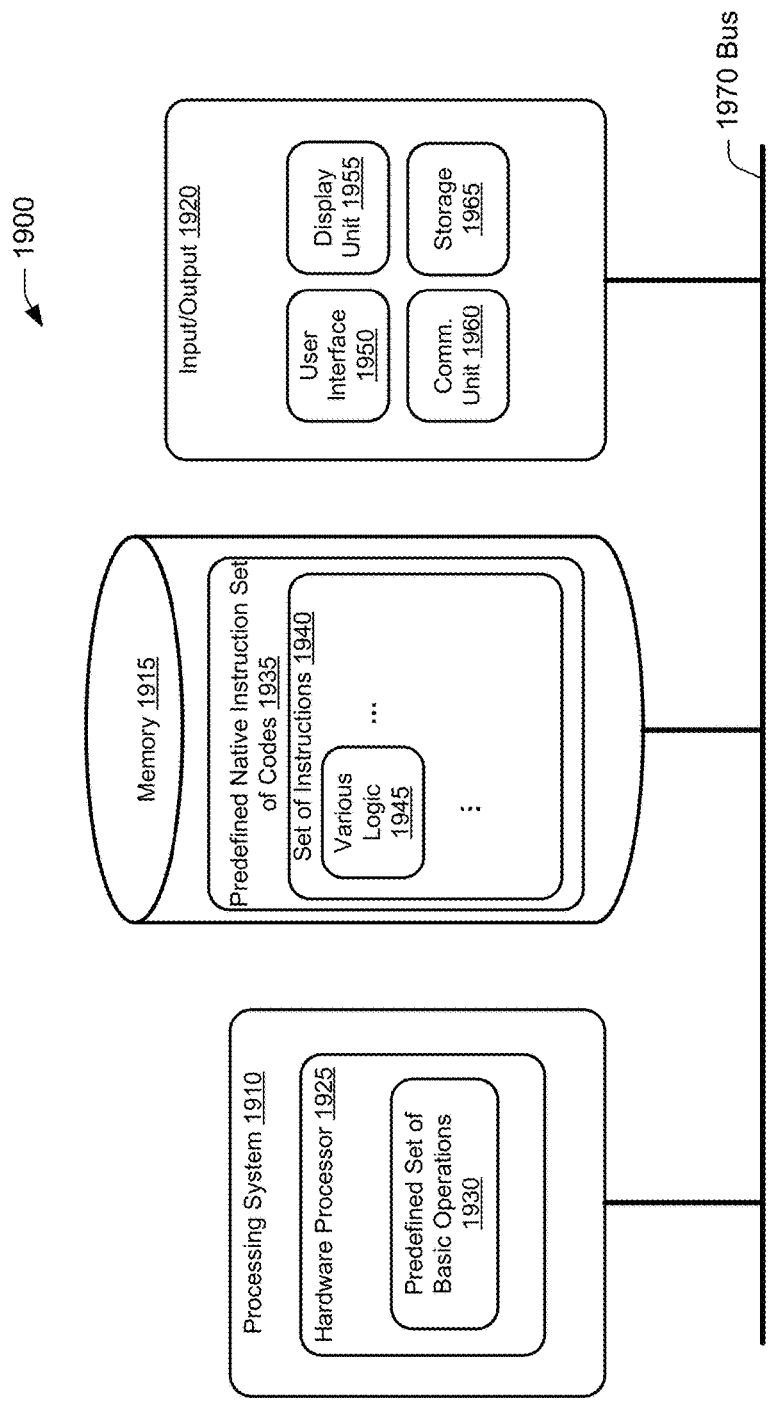
FIG. 19 illustrates a computing system including logic according to an embodiment.

FIG. 19 illustrates an apparatus or a computer system 1900, or apparatus, including logic according to an embodiment. The computer system 1900 includes a processing system 1910 having a hardware processor 1925 configured to perform a predefined set of basic operations 1930 by loading corresponding ones of a predefined native instruction set of codes 1935 as stored in the memory 1915.

Here, the term computer system includes a processing system such as processing system 1910 and a memory such as memory 1915 accessible to the processing system.

The processing system includes at least one hardware processor, and in other embodiments includes multiple processors or multiple processor cores. In one embodiment, a computer system is a standalone device. The processing system in yet another embodiment includes processors from different devices working together. In embodiments, a computer system includes multiple processing systems that communicate cooperatively over a computer network.

The following discussion explains how the logic, that implements the foregoing operations, transforms the hardware processor of computer system 1900 into a specially-programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction.

The collection of valid instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

A sequence of codes that a hardware processor is to execute, in the implementation of a given task, is referred to herein as logic. Logic is made up, therefore, not of software but of a sequence of codes or instructions, selected from the predefined native instruction set of codes of the hardware processor, and stored in the memory.

Returning to FIG. 19, the memory 1915 is accessible to the processing system 1910 via the bus 1970. The processing system controls also the input output unit 1920 via the bus 1970. The input output unit 1920 includes a user interface controller 1950, a display unit controller 1955, a communications unit controller 1960, and storage controller 1965.

The memory 1915 includes the predefined native instruction set of codes 1935, which constitute a set of instructions 1940 selectable for execution by the hardware processor 1925. In an embodiment, the set of instructions 1940 include logic 1945 representing the APS 300 as illustrated in FIG. 2, including the MIC generator 325, the verification system 330, and the verification API 335. In another embodiment, the set of instructions 1940 include logic 1945 representing the RPS 100 as illustrated in FIG. 3, including the UMD engagement logic 130 (a first respective sequence of instructions), the UMD information request logic 135 (a second respective sequence of instructions), the UMD verification logic 140 (a third respective sequence of instructions), the APS verification logic 145 (a fourth respective sequence of instructions), and other logic not separately shown, such as logic adapted to store the official information as hosted information and the like. The terms first through fourth in this paragraph do not imply any order of operation or use but are used only for discrimination of one sequence of instructions from another. In yet another embodiment, the set of instructions 1940 include logic 1945 representing the UMD 200 as illustrated in FIG. 4, including the RPS engagement logic 235, the RPS information access logic 240, the APS provisioning logic 245, and the APS/RPS consent logic 250. Such logic 1945 also is set forth above in greater detail with respect to the flowcharts illustrated in FIGS. 6-16.

The various logic 1945 is stored in the memory 1915 and comprises instructions 1940 selected from the predefined native instruction set of codes 1935 of the hardware processor 1925, adapted to operate with the processing system 1910 to implement the process or processes of the corresponding logic 1945.

CONCLUSION

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Computer storage media or memory includes volatile and non-volatile, removable and non-removable media and memory implemented in any method or technology for storage of information such as computer readable instructions, data structures, program modules, or other data. Computer storage media include, but are not limited to, random access memory (RAM), read-only memory (ROM), electrically erasable programmable read-only memory (EE-PROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter.

In accordance with some embodiments, information is stored in memory (at least temporarily) during performance of the methods for a variety of reasons. Example rationales include, but are not limited to, data processing convenience, communication convenience, permit batch validation or review, records maintenance, and so on, and combinations thereof.

Although headings are used for the convenience of the reader, these are not to be taken as limiting or restricting the systems, techniques, approaches, methods, devices to those appearing in any particular section. Rather, the teachings and disclosures herein can be combined or rearranged with other portions of this disclosure and the knowledge of one of ordinary skill in the art. It is the intention of this disclosure to encompass and include such variation.

What is claimed is:

1. An apparatus, to verify an age of a user, comprising:
a processing system having a hardware processor configured to perform a predefined set of basic operations by loading corresponding ones of a predefined native instruction set of codes, the predefined native instruction set of codes constituting a set of instructions selectable for execution by the hardware processor;
a memory accessible to the processing system;
a communication controller, under control of the processing system;
engagement logic, stored in the memory, comprising a first respective sequence of instructions selected from the predefined native instruction set of codes of the hardware processor and adapted to establish a secure connection with a user mobile-identification-credential device (UMD), having a mobile identification credential (MIC) associated with official information including a date of birth of the user, via the communication controller;
information request logic, stored in the memory, comprising a second respective sequence of instructions selected from the predefined native instruction set of codes of the hardware processor and adapted to send the UMD a MIC user information request message, seeking the official information associated with the MIC, over the secure connection;
verification logic, stored in the memory, comprising a third respective sequence of instructions selected from the predefined native instruction set of codes of the hardware processor and adapted to send an authorizing party system (APS) a token received from the UMD;
APS verification logic, stored in the memory, comprising a fourth respective sequence of instructions selected from the predefined native instruction set of codes of the hardware processor and adapted to receive the official information and to cryptographically verify the official information; and
the memory further storing instructions, selected from the predefined native instruction set of codes, defining logic adapted to:
send, by the online host serving as a relying party system (RPS), a MIC user information request message, with a scope custom tailored for use in requesting verification of an age of the user while maximizing privacy of the user, requesting the user to furnish their identity to verify the age;
receive, from the UMD, a user consent response token indicating selective approval of the user's consent to release a date of birth of the user corresponding to the age;
transmit the user consent response token to the APS; and
receive, from the APS, the MIC user information for the date of birth, corresponding to the user consent response token consenting to release only the date of birth from the APS to the RPS.

2. The apparatus of claim 1, wherein the MIC user information request message prompts the UMD to direct a user interface of the UMD to prompt the user asking for consent to release date of birth to online host.

3. The apparatus of claim 1, wherein the user consent response token does not contain MIC user information, and includes a consented data indication that indicates which of the user's MIC user information is consented for release by the APS in exchange for the user consent response token.

4. The apparatus of claim 1, the memory further storing instructions, selected from the predefined native instruction set of codes, defining logic adapted to request, by the online host serving as the RPS, a liveness check of the user, wherein the liveness check captures corresponding liveness information.

5. The apparatus of claim 4, wherein the online host serving as the RPS uses the liveness information as candidate information, based on a retina scan, a fingerprint, facial motion, heat detection, blood flow, or pulse detection.

6. The apparatus of claim 1, the memory further storing instructions, selected from the predefined native instruction set of codes, defining logic adapted to obtain, by the online host serving as the RPS, a verification of candidate information submitted by the user based on a threshold image comparison between a candidate photograph and a trusted photograph.

7. The apparatus of claim 6, the memory further storing instructions, selected from the predefined native instruction set of codes, defining logic adapted to obtain the verification of the candidate information from a Department of Motor Vehicles (DMV), based on requesting the DMV to perform a photographic comparison between a candidate photograph and a trusted DMV photograph.

8. The apparatus of claim 6, the memory further storing instructions, selected from the predefined native instruction set of codes, defining logic adapted to obtain the verification of the candidate information from the UMD performing a photographic comparison between a candidate photograph and a trusted photograph that is part of the MIC user information.

9. The apparatus of claim 6, the memory further storing instructions, selected from the predefined native instruction set of codes, defining logic adapted to obtain the verification of the candidate information from the online host serving as the RPS performing a photographic comparison between a candidate photograph and a trusted photograph obtained from the MIC user information.

10. The apparatus of claim 6, wherein the threshold image comparison between the candidate photograph and the trusted photograph is based on facial recognition matching within a threshold percentage.

11. The apparatus of claim 1, wherein the MIC user information request message directs the UMD to request the user to selectively indicate which portion of the official information is approved for public release and which portion is hidden and not published.

12. The apparatus of claim 11, wherein the portion of the official information approved for public release at the online host is age of the user, and the portion of the official information hidden and not published at the online host is an official base truth photograph of the user.

13. The apparatus of claim 11, wherein the portion of the official information approved for public release at the online host is gender of the user, and the portion of the official information hidden and not published at the online host is height and weight of the user.

14. The apparatus of claim 1, wherein the MIC user information request message directs the UMD to request the user to indicate which portion of the official information is approved for selective release, and conditions to be satisfied by a viewer in order to selectively release the portion of the official information to be viewed by the viewer.

15. The apparatus of claim 14, wherein the portion of the official information is approved for selective release at the online host to viewers at or above a threshold age, and hidden and not published at the online host to viewers below the threshold age.

16. The apparatus of claim 14, wherein the portion of the official information is approved for selective release at the online host to viewers within an age range, and hidden and not published at the online host to viewers outside the age range.

17. The apparatus of claim 1, wherein the MIC is associated with a non-governmental form of identification corresponding to a non-governmental entity, and the online host serving as the RPS obtains verification of the official information from the non-governmental entity.

18. The apparatus of claim 1, wherein the MIC is associated with an employee identification corresponding to an employer, and the online host serving as the RPS obtains verification of the official information from the employer.

19. The apparatus of claim 1, the memory further storing instructions, selected from the predefined native instruction set of codes, defining logic adapted to identify, compare, and designate as trustworthy and genuinely representing the user a plurality of hosted images comprising a user's hosted image gallery.

20. The apparatus of claim 1, the memory further storing instructions, selected from the predefined native instruction set of codes, defining logic adapted to identify, compare, and designate as trustworthy hosted information comprising a user account, the hosted information including a plurality of different types of information corresponding to MIC user information of the user account.

21. The apparatus of claim 1, the memory further storing instructions, selected from the predefined native instruction set of codes, defining logic adapted to cause the online host serving as the RPS to send the UMD the MIC user information request message to request an authorized identity photograph from the MIC of the user.

22. The apparatus of claim 1, the memory further storing instructions, selected from the predefined native instruction set of codes, defining logic adapted to cause the online host serving as the RPS to request from the UMD, responsive to verification of the official information, an upload of a user resumé.

23. The apparatus of claim 1, the memory further storing instructions, selected from the predefined native instruction set of codes, defining logic adapted to cause the online host serving as the RPS to communicate with a back-end system, wherein the back-end system cross-references the official information against a sex offender registry, the logic further being adapted to determine whether the official information pertains to the user being listed on the sex offender registry, and if so, restrict access to hosted information.

24. The apparatus of claim 1, the memory further storing instructions, selected from the predefined native instruction set of codes, defining logic adapted to cause the online host serving as the RPS to communicate with a back-end system, wherein the back-end system cross-references the official information against a crimes against minors registry, the logic further being adapted to determine whether the official information pertains to the user being listed on the crimes against minors registry, and if so, restrict access to hosted information.

25. The apparatus of claim 1, the memory further storing instructions, selected from the predefined native instruction set of codes, defining logic adapted to cause the online host serving as the RPS to communicate with other servers to determine whether the official information pertains to pertinent information stored on the other servers.

26. The apparatus of claim 1, the memory further storing instructions, selected from the predefined native instruction set of codes, defining logic adapted to cause the online host serving as the RPS to send the UMD the MIC user information request message that includes a request to release a plurality of different specific types of user information.

27. The apparatus of claim 26, wherein the specific types of user information include user photograph, user full name, and user data of birth.

28. An apparatus, for an online host to verify an age of a user, comprising:
a processing system having a hardware processor configured to perform a predefined set of basic operations by loading corresponding ones of a predefined native instruction set of codes, the predefined native instruction set of codes constituting a set of instructions selectable for execution by the hardware processor;
a memory accessible to the processing system;
a communication controller, under control of the processing system;
engagement logic, stored in the memory, comprising a first respective sequence of instructions selected from the predefined native instruction set of codes of the hardware processor and adapted to establish a secure connection with a user mobile-identification-credential device (UMD), having a mobile identification credential (MIC) associated with official information including a date of birth of the user, via the communication controller;
information request logic, stored in the memory, comprising a second respective sequence of instructions selected from the predefined native instruction set of codes of the hardware processor and adapted to send the UMD a MIC user information request message, seeking the official information associated with the MIC, over the secure connection;
verification logic, stored in the memory, comprising a third respective sequence of instructions selected from the predefined native instruction set of codes of the hardware processor and adapted to send an authorizing party system (APS) a token received from the UMD;
APS verification logic, stored in the memory, comprising a fourth respective sequence of instructions selected from the predefined native instruction set of codes of the hardware processor and adapted to receive the official information and to cryptographically verify the official information; and
the memory further storing instructions, selected from the predefined native instruction set of codes, defining logic adapted to:
send, by the online host serving as a relying party system (RPS), a MIC user information request message, with a scope custom tailored for use in requesting verification of the age of the user while maximizing privacy of the user, requesting the user to furnish their identity to verify the age;

receive, from the UMD, MIC user information for the date of birth as stored on the UMD, responsive to user consent corresponding to the scope of the MIC user information request message requesting release of only the date of birth from the UMD;

send, by the RPS, a verification token to the APS to cryptographically verify that the MIC user information from the UMD is official;

obtain, by the RPS, verification of the MIC user information being official for representing the date of birth of the user pertaining to the age of the user; and designate, by the RPS, the age of the user as base truth information being trustworthy and genuinely representing the user.

29. The apparatus of claim 28, wherein the MIC is a state-issued identification containing official, biographic, biometric and other MIC user information pertaining to the user.

\* \* \* \* \*